United States Patent [19]

Machida et al.

[11] Patent Number: 5,418,276

[45] Date of Patent: May 23, 1995

[54] GRAFT COPOLYMER, PROCESS FOR PRODUCTION THEREOF AND RESIN COMPOSITION CONTAINING SAME

[75] Inventors: Shuji Machida; Noriyuki Tani, both of Sodegaura, Japan

[73] Assignee: Idemitsu Kosan Co., Ltd., Tokyo, Japan

[21] Appl. No.: 280,740

[22] Filed: Jul. 26, 1994

Related U.S. Application Data

[62] Division of Ser. No. 25,781, Mar. 3, 1993, Pat. No. 5,362,814.

[30] Foreign Application Priority Data

Mar. 3, 1992 [JP] Japan ................... 4-045626
May 20, 1992 [JP] Japan ................... 4-151247

[51] Int. Cl.⁶ .................. C08L 51/04; C08L 51/06; C08F 4/602; C08F 255/06
[52] U.S. Cl. ............................. 524/504; 524/545; 524/553; 524/567; 524/574; 524/578; 524/579; 525/64; 525/75; 525/76; 525/86; 525/247; 525/324
[58] Field of Search .......... 524/504, 545, 553, 567, 524/574, 578, 579; 525/64, 75, 76, 86, 247, 324

[56] References Cited

U.S. PATENT DOCUMENTS 5,247,020 9/1993 Nakano et al. .................. 525/249
5,250,629 10/1993 Tani et al. ....................... 125/268

Primary Examiner—Vasu S. Jagannathan
Attorney, Agent, or Firm—Oblon, Spivak, McClelland, Maier & Neustadt

[57] ABSTRACT

There are disclosed a graft copolymer formed by grafting a styrenic monomer onto a high polymer having double bonds in the side chain to constitute highly syndiotactic polystyrenic chain as the graft component, the graft copolymer having a content of graft component of 0.005 to 99% by weight and a reduced viscosity of 0.01 to 30 dl/g as measured at a concentration of 0.05 g/dl in 1,2,4-trichlorobenzene at 135° C. or a melt index of 0.001 to 500 g/10 minutes as measured at 300° C. under a load of 2.16 kg; a process for efficiently producing the above graft copolymer using a catalyst comprising specific components; and a resin composition comprising the above graft copolymer, a highly syndiotactic styrenic polymer or other thermoplastic resin and, when necessary, an inorganic or organic filler. The above graft copolymer and resin composition are excellent in resistance to heat and chemicals, electrical properties, moldability, compatibility, impact resistance, etc.

18 Claims, 3 Drawing Sheets

GRAFT COPOLYMER, PROCESS FOR PRODUCTION THEREOF AND RESIN COMPOSITION CONTAINING SAME

This is a division, of application Ser. No. 08/025,781, filed on Mar. 3, 1993, now U.S. Pat. No. 5,362,814.

BACKGROUND OF THE INVENTION

1. Field of the Invention

The present invention relates to a novel graft copolymer, a process for producing the copolymer and a resin composition containing the copolymer. More particularly, it pertains to a novel graft copolymer having syndiotactic polystyrene chain as the graft component which copolymer is excellent in heat resistance, chemical resistance, electrical properties, moldability, etc., favorable in toughness, tensile strength, tensile elongation, tensile modulus of elasticity and compatibility and also useful as a raw material for composite materials, heat resistant elastomer and the like; a process for efficiently producing the aforesaid copolymer; and a resin composition comprising the aforementioned copolymer as the principal component which composition is endowed with compatibility, adhesivity, impact resistance and well balanced physical properties.

2. Description of the Related Arts

As styrenic polymers, there are generally known a styrenic polymer produced by radical polymerization the stereostruction of which is of atactic configuration and a styrenic polymer obtained by the use of a Ziegler series catalyst the stereostructure of which is also of atactic configuration.

Heretofore, styrenic polymers produced by the radical polymerization method have been molded to various shapes by various molding methods and widely used as domestic electrical appliances, office machines, household goods, packaging containers, toys, furnitures, synthetic papers and other industrial materials. Because of their atactic configuration in stereochemical structure, however, such styrenic polymers have suffered the disadvantages of inferior heat resistance and chemical resistance.

Under such circumstances, in order to solve the above-mentioned disadvantages of the styrenic polymers having atactic configuration, the group of the present inventors succeeded in the development of the styrenic polymers having a high degree of syndiotactic configuration, and further a syndiotactic styrenic polymer formed by copolymerizing a styrene monomer with the other component. (refer to Japanese Patent Application Laid-Open Nos. 104818/1987, 187708/1987 and 241009/1988).

The above-developed syndiotactic polymer or copolymer is excellent in heat resistance, chemical resistance, electrical properties, moldability, etc., and is expected to find new applications in a variety of fields.

However, the aforesaid styrenic polymer, especially the syndiotactic polystyrene (SPS) is not sufficient in toughness, elongation, impact resistance, compatibility with other type of resin and is almost devoid of adhesivity to a metal, thereby inevitably restricting the scope of application.

As a means for improving such drawback, there is proposed a method in which an α-olefin is grafted onto SPS, which method however, still suffers the disadvantage that the grafted copolymer can not sufficiently be developed to an elastomer, since the method fails to form a structure wherein the soft segment consisting of the α-olefin chain is placed between the hard segments consisting of styrene chain.

On the other hand, an attempt is made to employ the divinylbenzene residue of the polymer main chain as the graft reaction initiation point (refer to Japanese Patent Laid-Open Application Nos. 118510/1989 and 123811/1989), but nothing is known so far about the actual example of the copolymer formed by grafting the olefinic graft precursor onto SPS. Examples of the known copolymer with SPS include an olefin/SPS copolymer and an unsaturated carboxylic acid ester/SPS and the like (refer to Japanese Patent Application Laid-Open No. 7705/1991).

Although a highly crystalline copolymer is obtained by the aforesaid process in the case of a low content of the monomer, a high content thereof results in the formation of an amorphous polymer, thus failing to make full use of the mechanical, thermal and chemical characteristics of SPS. The aforesaid process, therefore, suffers the disadvantage that the amount of the copolymerizable monomer is limited for the purpose of maintaining a high degree of syndiotacticity, which makes it impossible to obtain in a wide range the materials having the characteristics of SPS by compounding therein with other thermoplastic resin or a filler.

The use of a resin compatibilizer as the third component is taken into consideration, but an appropriate resin compatibilizer can not be found because of the high molding temperature of SPS and further, the use thereof unfavorably causes the possibility of bringing about the deterioration of the resin composition to be produced.

Under such circumstances, intensive research and investigation were made by the present inventors for the purpose of developing and providing a SPS-based graft copolymer having SPS chain grafted thereonto, which copolymer maintains the inherent characteristics of SPS excellent in heat resistance, chemical resistance, electrical properties, moldability, etc., and is improved in toughness, tensile strength, tensile elongation, tensile modulus of elasticity and compatibility with an olefinic resin and a diene resin and the like, thereby making itself useful as a raw material for composite materials and heat resistant elastomers.

As a result, it has been found by the present inventors that the above-mentioned purpose is attained by the copolymer formed by copolymerizing a styrenic monomer in a specific proportion with a high polymer having polymerizable carbon-carbon double bonds in the side chain thereof and having a high degree of syndiotactic configuration with regard to the stereoregularity of its styrenic chain as well as a reduced viscosity and a melt index each in a prescribed range; the aforementioned copolymer is easily obtained by grafting a styrenic monomer onto a high polymer having polymerizable carbon-carbon double bond in the side chain thereof; and a resin composition comprising the aforesaid graft copolymer as the principal component can also achieve the purpose. The present invention has been accomplished on the basis of the above-mentioned finding and information.

SUMMARY OF THE INVENTION

It is an object of the present invention to provide a graft copolymer excellent in heat resistance, chemical resistance, electrical properties, moldability and the like.

It is another object of the present invention to provide a graft copolymer favorable in toughness, tensile strength, tensile elongation, tensile modulus of elasticity and compatibility and also useful as a raw material for composite material, heat resistant elastomer and the like.

It is still another object of the present invention to provide a process for efficiently producing the aforesaid graft copolymer.

It is a further object of the present invention to provide a resin composition endowed with compatibility, adhesivity, impact resistance and well balanced physical properties.

Other objects of the present invention will become apparent from the description in the text hereinafter disclosed.

Specifically, the present invention provides a graft copolymer formed by grafting a styrenic monomer onto a high polymer having polymerizable carbon-carbon double bonds in the side chain thereof to copolymerize therewith and constitute syndiotactic polystyrene chain as the graft component, said copolymer being characterized in that the stereostructure of the chain consisting of the styrenic monomer units is of high degree of syndiotactic configuration; the content of the styrenic monomer unit is 0.005 to 99.9% by weight; and it has a reduced viscosity of 0.01 to 30 dl/g as measured at a concentration of 0.05 g/dl in 1,2,4-trichlorobenzene at 135° C. or a melt index of 0.001 to 500 g/10 minutes as measured at 300° C. under a load of 2.16 kg.

The present invention also provides a process for producing the aforestated graft copolymer which comprises grafting a styrenic monomer onto a high polymer having polymerizable carbon-carbon double bonds in the side chain thereof to copolymerize therewith in the presence of a catalyst comprising as principal components (1)(a) a transition metal compound and (b) an aluminoxane; or (2)(a) a transition metal compound and (c) a compound capable of reacting with a transition metal compound to form an ionic complex.

The present invention further provides a resin composition which comprises (A) the above-mentioned graft copolymer, (B) at least one member selected from a styrenic polymer having a high degree of syndiotactic configuration and a thermoplastic resin other than said polymer and/or (C) at least one filler selected from an inorganic filler and an organic filler.

DESCRIPTION OF PREFERRED EMBODIMENT

Various high polymers each having polymerizable carbon-carbon double bond in the side chain thereof may be employed in the present invention without specific limitation and are each preferably constituted of an olefinic monomer trait and a diolefinic monomer unit. The olefinic monomer unit is exemplified by ethylene, α-olefin, halogen-substituted α-olefin and cyclic olefin.

Specific examples of the α-olefin includes propylene; butene-1; hexene-1; octene-1; decene-1; heptene-1; pentene-1; nonene-1; 4-phenylbutene-1; 6-phenylhexene-1; 3-methylbutene-1; 4-methylpentene-1; 3-methylpentene-1; 3-methylhexene-1; 4-methylhexene-1; 5-methylhexene-1; 3,3-dimethylpentene-1; 3,4-dimethylpentene-1; 4,4-dimethylpentene-1; vinylcyclohexane; and vinylcyclohexene.

Specific examples of the halogen-substituted α-olefin include hexafluoropropene; tetrafluoroethylene; 2-fluoropropene; fluoroethylene; 1,1-difluoroethylene, 3-fluoropropene, trifluoroethylene; and 3,4-dichlorobutene-1.

Specific examples of the cyclic olefin include norbornene; 5-methylnorbornene; 5-ethylnorbornene; 5,6-dimethylnorbornene; and 1-methylnorbornene.

The olefinic monomer unit may be used alone or in combination with at least one unit, particularly desirably as the combination of ethylene unit and an α-olefin unit. In this case, ethylene unit/an α-olefin unit copolymer constituted of ethylene units and α-olefin units has an ethylene component in a ratio of 40 to 98 mol %, preferably 50 to 97 tool % and an α-olefin component in a ratio of 60 to 2 mol %, preferably 50 to 3 mol %.

The diolefinic monomer is used for introducing double bonds in the side chain of a high polymer and exemplified by a conjugated diene compound having 4 to 20 carbon atoms such as 1,3-butadiene; chloroprene; isoprene; 1,3-hexadiene; and 1,3-heptadiene, a cyclic olefin such as vinylnorbornene and vinylstyrenic compound represented by the general formula (I) or (II)

(I)

or (II)

wherein $R^1$ in the general formula (I) is a hydrocarbon group having 1 to 20 carbon atoms; $R^2$ in the general formula (I) or (II) is a halogen atom or a hydrocarbon group having 1 to 8 carbon atoms; $R^3$ in the general formula (I) or (II) hydrogen atom, is a halogen atom or a hydrocarbon group having 1 to 8 carbon atoms; m is zero or an integer of 1 to 4; and when m is 2 or more, a plurality of $R^2$ may be the same as or different from one another.

Among them, is particularly desirable a vinylstyrenic compound represented by the general formula (I) or (II).

Specific examples of the vinylstyrenic compounds represented by the general formula (I) include p-(2-propenyl)styrene, m-(2-propenyl)styrene, p-(3-butenyl)styrene, m-(3-butenyl)styrene, o-(3-butenyl)styrene, p-(4-pentenyl)styrene, m-(4-pentenyl)styrene, o-(4-pentenyl)styrene, p-(7-octenyl)styrene, p-(2-methyl-3-butenyl)styrene, p-(1-methyl-3-butenyl)styrene, p-(3-methyl-3-butenyl)styrene, p-(2-ethyl-3-butenyl)styrene, p-(2-ethyl-4-pentenyl)styrene, m-(2-methyl-3-butenyl)styrene, o-(2-methyl-3-butenyl)styrene, 4-vinyl-4'-(3-butenyl)biphenyl, 4-vinyl-4'-(4-pentenyl)biphenyl, 4-vinyl-3'-(3-butenyl)biphenyl, 4-vinyl-2'-(4-pentenyl)biphenyl, 4-vinyl-4-(2-methyl-3-butenyl)biphenyl, m-(3-butenyl)-α-methylstyrene, o-(3-butenyl)-α-methylstyrene and p-(3-butenyl)-α-methylstyrene.

Examples of the vinylstyrenic compounds represented by the general formula (II) include those exemplified by the general formula (I) in which the α-olefin residue is substituted by a vinyl group, and specifically divinylbenzene, divinyltoluene and isopropenylstyrene.

The diolefinic monomer may be used alone or in combination with at least one other monomer in the present invention.

In order to regulate the graft efficiency and graft chain length in a wide range, it is advantageous that a high polymer having polymerizable carbon-carbon bonds in the side chain thereof to be employed in the present invention has graft points of styrenically unsaturated double bonds.

Such high polymer as mentioned above can be produced by copolymerizing at least one compound selected from the olefinic monomers with at least one compound selected from the vinylstyrenic compounds represented by the general formula (I) or (II) by the use of a catalyst comprising as the principal components a transition metal compound and an organometallic compound (especially a trialkylaluminum) or a catalyst comprising as the principal components a supported transition metal compound and an organometallic compound. By the aforesaid process, styrenically unsaturated double bonds can be introduced in the side chains.

The formation of graft initiation points by the use of the vinylstyrenic compound represented by the general formula (II) is susceptible to limitations in the process such as susceptibility to the formation of crosslinked product, difficulty in assuring sufficient reactivity and the monomers remaining unreacted. On the other hand, the formation thereof by the use of the vinylstyrenic compound represented by the general formula (I) is unlikely to cause crosslinkage and attains high reactivity. The use of an α-olefin double bond residue for graft initiation points can produce a graft polymer but makes it difficult to regulate the graft chain length or graft efficiency in a wide range.

The high polymer having polymerizable carbon-carbon bonds in the side chain thereof obtained in the above way may be any of atactic, isotactic and syndiotactic configurations and with regard to copolymerization system, it may be copolymerized in random or block type. The content of unsaturated groups in the polymer is $1 \times 10^{-5}$ to 15 mol %, preferably $1 \times 10^{-4}$ to 10 mol %. The molecular weight of the polymer in terms of reduced viscosity as measured at a concentration of 0.05 g/dl in 1,2,4-trichlorobenzene at 135° C. is preferably in the range of 0.01 to 30 dl/g. There may be used a polymer containing in part a component insoluble in the solvent to the extent that the production of the copolymer is possible.

Particularly desirable examples of the high polymer thus produced include an ethylene/α-olefin copolymer having graft initiation points, especially an ethylene/propylene series copolymer, an ethylene/butene-1 series copolymer and further an ethylene/diene copolymer and an ethylene/α-olefin copolymer each having graft initiation points.

The graft copolymer according to the present invention is that obtained by grafting a styrenic monomer onto the above-described high polymer to copolymerize therewith.

The styrenic monomer is a compound represented by the general formula (III)

(III)

wherein $R^4$ is a hydrogen atom, a halogen atom or a substituent having at least one atom selected atom carbon, tin and silicon, n is an integer from 1 to 5 and when n is a plural, each $R^4$ may be the same or different.

Specific examples of the styrenic monomers III include alkylstyrene such as styrene, p-methylstyrene, o-methylstyrene, m-methylstyrene, 2,4-dimethylstyrene, 2,5-dimethylstyrene, 3,4-dimethylstyrene, 3,5-dimethylstyrene and p-tert-butylstyrene; halogenated styrenes such as p-chlorostyrene, m-chlorostyrene, o-chlorostyrene, p-bromostyrene, m-bromostyrene, o-bromostyrene, p-fluorostyrene, m-fluorostyrene, o-fluorostyrene and o-methyl-p-fluorostyrene; vinylbiphenyls such as 4-vinylbiphenyl, 3-vinylbiphenyl and 2-vinylbiphenyl; vinylphenylnaphthalenes such as 1-(4-vinylphenyl)naphthalene, 2-(4-vinylphenyl)naphthalene, 1-(3-vinylphenyl)naphthalene, 2-(3-vinylphenyl)naphthalene, 1-(2-vinylphenyl)naphthalene and 2-(2-vinylphenyl)naphthalene; vinylphenylanthracenes such as 1-(4-vinylphenyl)anthracene, 2-(4-vinylphenyl)anthracene, 9-(4-vinylphenyl)anthracene, 1-(3-vinylphenyl)anthracene, 2-(3-vinylphenyl)anthracene, 9-(3-vinylphenyl)anthracene, 1-(2-vinylphenyl)anthracene, 2-(2-vinylphenyl)anthracene and 9-(2-vinylphenyl)anthracene; vinylphenylphenanthrene such as 1-(4-vinylphenyl)phenanthrene, 2-(4-vinylphenyl)phenanthrene, 3-(4-vinylphenyl)phenanthrene, 4-(4-vinylphenyl)phenanthrene, 9-(4-vinylphenyl)phenanthrene, 1-(3-vinylphenyl)phenanthrene, 2-(3-vinylphenyl)phenanthrene, 3-(3-vinylphenyl)phenanthrene, 4-(3-vinylphenyl)phenanthrene, 9-(3-vinylphenyl)phenanthrene, 1-(2-vinylphenyl)phenanthrene, 2-(2-vinylphenyl)phenanthrene, 3-(2-vinylphenyl)phenanthrene, 4-(2-vinylphenyl)phenanthrene and 9-(2-vinylphenyl)phenanthrene; vinylphenylpyrenes such as 1-(4-vinylphenyl)pyrene, 2-(4-vinylphenyl)pyrene, 1-(3-vinylphenyl)pyrene, 2-(3-vinylphenyl)pyrene, 1-(2-vinylphenyl)pyrene and 2-(2-vinylphenyl)pyrene; vinylterphenyls such as 4-vinyl-p-terphenyl, 4-vinyl-m-terphenyl, 4-vinyl-o-terphenyl, 3-vinyl-p-terphenyl, 3-vinylm-terphenyl, 3-vinyl-o-terphenyl, 2-vinyl-p-terphenyl, 2-vinyl-m-terphenyl and 2-vinyl-o-terphenyl; vinylphenylterphenyls such as 4-(4-vinylphenyl)-p-terphenyl; vinylalkylbiphenyls such as 4-vinyl-4'-methylbiphenyl, 4-vinyl-3'-methylbiphenyl, 4-vinyl-2'-methylbiphenyl, 2-methyl-4-vinylbiphenyl and 3-methyl-4-vinylbiphenyl; halogenated vinylbiphenyls such as 4-vinyl-4'-fluorobiphenyl, 4-vinyl-3'-fluorobiphenyl, 4-vinyl-2'-fluorobiphenyl, 4-vinyl-2-fluorobiphenyl, 4-vinyl-3-fluorobiphenyl, 4-vinyl-4'-chlorobiphenyl, 4-vinyl-3'-chlorobiphenyl, 4-vinyl-2'-chlorobiphenyl, 4-vinyl-2-chlorobiphenyl, 4-vinyl-3-chlorobiphenyl, 4-vinyl-4'-bromobiphenyl, 4-vinyl-3'-bromobiphenyl, 4-vinyl-2'-bromobiphenyl, 4-vinyl-2-bromobiphenyl and 4-vinyl-3-bromobiphenyl; trialkylsilylvinylbiphenyls such as 4-vinyl-4'-trimethylsilylbiphenyl; trialkylstannylvinylbiphenyls such as 4-vinyl-4'-trimethylstannylbiphenyl and 4-vinyl-4'-tributyistannylbiphenyl; trialkylsilylmethylvinylbiphenyls such as 4-vinyl-4'-trimethylsilylmethylbiphenyl; trialkylstannylmethylvinylbiphenyls such as 4-vinyl-4'-trimethylstannylmethylbiphenyl and 4-vinyl-4'-tributylstannylmethylbiphenyl; halogen-substituted alkylstyrene such as p-chloroethylstyrene, m-chloroethylstyrene and o-chloroethylstyrene; alkylsilylstyrene such as p-trimethylsilylstyrene, m-trimethylsilylstyrene, o-trimethylsilylstyrene, p-triethylsilylstyrene, m-triethylsilylstyrene, o-triethylsilylstyrene and p-dimethyl-tert-butylsilylstyrene; phenyl group-containing silylstyrene such as p-dimethylphenylsilylstyrene, p-methyldiphenylsilylstyrene and p-triphenylsilylstyrene; halogen-containing silylstyrene such as p-dimethylchlorosilylstyrene, p-methyldichlorosilylstyrene, p-trichlorosilylstyrene, p-dimethylbromosilylstyrene and p-dimethyliodosilylstyrene; silyl group-containing silylstyrene such as p-(p-trimethylsilyl)dimethylsilylstyrene. The styrenic monomer may be used alone or in combination with at least one other styrenic monomer.

Various processes are available for producing the graft copolymer of the present invention. According thereto, there is employed a catalyst comprising as principal components (1)(a) a transition metal compound and (b) an alumioxane; or (2)(a) a transition metal compound and (c) a compound capable of reacting with a transition metal compound to form an ionic complex.

Various transition metal compounds are available as the component (a) and exemplified by the compounds represnted by the general formula (IV)

$$M^1R^5-R^k \quad (IV)$$

wherein M1 is Ti, Zr, Cr, V, Nb, Ta or Hf atom; $R^5$ to $R^k$ are each a hydrogen atom, an oxygen atom, a halogen atom, an alkyl group having 1 to 20 carbon atoms, an alkoxy group having 1 to 20 carbon atoms, an aryl group, an alkylaryl gruop or an arylalkyl group each having 6 to 20 carbon atoms, an acyloxy group having 1 to 20 carbon atoms, an allyl gorup, a substiuted allyl group, an acetylacetonato group, a substituted acetylacetonato group, a substituent containing silicon atom, a ligand such as a carbonyl, an oxygen molecule, a nitrogen molecule, a Lewis base, an unsaturated chain hydrocarbon or unsaturated cyclic hydrocarbon, cyclopentadienyl group, substituted cyclopentadienyl group, indenyl group, substituted indenyl group, tetrahydroindenyl group, substituted tetrahydroindenyl group, fluorenyl group or substituted fluorenyl group; and k is the valency of the metal, that is, usually an integer of 2 to 5; and the ligands in $R^5$ to $R^k$ may form a crosslinked structure among them by covalent bond.

Examples of the substituted cyclopentadienyl group in the above-mentioned formula (IV) include methylcyclopentadienyl group; ethylcyclopentadienyl group; isopropylcyclopentadienyl group; 1,2-dimethylcyclopentadienyl group; tetramethylcyclopentadienyl group; 1,3-dimethylcyclopentadienyl group; 1,2,3-trimethylcyclopentadienyl group; 1,2,4-trimethylcyclopentadienyl group; pentamethylcyclopentadienyl group and trimethylsilylcyclopentadienyl group. Specific examples of $R^5$ to $R^k$ include F, Cl, Br and I as halogen atom; methyl, ethyl, n-propyl, isopropyl, n-butyl, octyl and 2-ethylhexyl group as alkyl group having 1 to 20 carbon atoms; methoxy, ethoxy, propoxy, butoxy and phenoxy group as alkoxy group having 1 to 20 carbon atoms; phenyl, tolyl, xylyl and benzyl group as aryl, alkylaryl or arylalkyl group each having 6 to 20 carbon atoms; heptadecylcarbonyloxy group as acyloxy group having 1 to 20 carbon atoms; trimethylsilyl and (trimethylsilyl)methyl group as substituent containing silicon atom; as Lewis base, ethers such as dimethyl ether, diethyl ether and tetrahydrofuran; thioethers such as tetrahydrothiophene; esters such as ethylbenzoate; nitriles such as acetonitrile and benzonitrile; amines such as trimethylamine, triethylamine, tributylamine, N,N-dimethylaniline, pyridine, 2,2'-bipyridine and phenanthroline; phosphine such as triethylphosphine and triphenylphosphine; unsaturated chain hydrocarbon such as ethylene, butadiene, 1-pentene, isoprene, pentadiene, 1-hexene and derivatives thereof; unsaturated cyclic hydrocarbon such as benzene, toluene, xylene, cycloheptatriene, cyclooctadiene, cyclooctatriene, cyclooctatetraene and derivatives thereof. Examples of crosslinkage by covalent bond include methylene, dimethylmethylene, ethylene, dimethylsilylene, dimethylgermylene and dimethylstannylene crosslinkage.

Among the transition metal compounds represented by the general formula (IV), specific examples of titanium compounds include tetramethoxytitanium, tetraethoxytitanium, tetra-n-butoxytitanium, tetraisopropoxytitanium, titanium tetrachloride, titanium trichloride, titanium dichloride, titanium hydride, cyclopentadienyltrimethyltitanium, dimethoxytitanium dichloride, methoxytitanium trichloride, trimethoxytitanium chloride, cyclopentadienyltriethyltitanium, cyclopentadienyltripropyltitanium, cyclopentadienyltributyltitanium, methylcyclopentadienyltrimethyititanium, 1,2-dimethylcyclopentadienyltrimethyltitanium, pentamethylcyclopentadienyltrimethyltitanium, pentamethylcyclopentadienyltriethyltitanium, pentamethylcyclopentadienyltripropyltitanium, pentamethylcyclopentadienyltributyltitanium, cyclopentadienylmethyltitanium dichloride, pentamethylcyclopentadienylmethyltitanium dichloride, cyclopentadienyldimethyltitanium monochloride, cyclopentadienyldiethyltitanium monochloride, cyclopentadienyltitanium trimethoxide, cyclopentadienyltitanium triethoxide, cyclopentadienyltitanium tripropoxide, cyclopentadienyltitanium triphenoxide, pentamethylcyclopentadienyltitanium trimethoxide, pentamethylcyclopentadienyltitanium triethoxide, pentamethylcyclopentadienyltitanium tripropoxide, pentamethylcyclopentadienyltitanium tributoxide, pentamethylcyclopentadienyltitanium triphenoxide, cyclopentadienyltitanium trichloride, pentamethylcyclopentadienyltitanium trichloride, cyclopentadienylmethoxytitanium dichloride, cyclopentadienyldimethoxytitanium chloride, pentamethylcyclopentadienylmethoxytitanium dichloride, cyclopentadienyltribenzyltitanium, pentamethylcyclopentadienylmethyldiethoxytitanium, indenyltitanium trichloride, indenyltitanium trimethoxide, indenyltitanium triethoxide, indenyltrimethyltitanium, indenyltribenzyltitanium, and the like.

Among the transition metal compounds represented by the general formula (IV), specific examples of zircon iron compound ($M^1=Zr$) include dicyclopentadienylzirconium dichloride, tetrabutoxyzirconium, zirconium tetrachloride, tetraphenylzirconium, cyclopentadienylzirconium trimethoxide, pentamethylcyclopentadienylzirconium trimethoxide, cyclopentadienyltribenzylzirconium, pentamethylcyclopentadienyltribenzylzirconium, bis(indenyl)zirconium dichloride, dibenzylzirconium dichloride, tetrabenzylzirconium, tributoxyzirconium chloride, triisopropoxyzirconium chloride, pentamethylcyclopentadienyltrimethylzirconium, pentamethylcyclopentadienyltriphenylzirconium, pentamethylcyclopentadienyltrichlorozirconium, cyclopentadienyltrimethylzirconium, cyclopentadienyltriphenylzirconium, cyclopentadienyltrichlorozirconium, cyclopentadienyldimethylmethoxyzirconium, methylcyclopentadienyltrimethylzirconium, methylcyclopentadienyltriphenylzirconium, methylcyclopentadienyltribenzylzirconium, methylcyclopentadienyltrichlorozirconium, methylcyclopentadienyldimethylmethoxyzirconium, dimethylcyclopentadienyltrichlorozirconium, trimethylcyclopentadienyltrichlorozirconium, trimethylsilylcyclopentadienyltrimethylzirconium, tetramethylcyclopentadienyltrichlorozirconium, bis(cyclopentadienyl)dimethylzirconium, bis(cyclopentadienyl)diphenylzirconium, bis(cyclopentadienyl)diethylzirconium, bis(cyclopentadienyl)dibenzylzirconium, bis(cyclopentadienyl)dimethoxyzirconium, bis(cyclopentadienyl)dichlorozirconium, bis(cyclopentadienyl)dihydridezirconium, bis(cyclopentadienyl)monochloromonohydridezirconium, bis(methylcyclopentadienyl)dimethylzirconium, bis(methylcyclopentadienyl)dichlorozirconium, bis(methylcyclopentadienyl)dibenzylzirconium, bis(pentamethylcyclopentadienyl)dimethylzirconium, bis(pentamethylcyclopentadienyl)dichlorozirconium, bis(pentamethylcyclopentadienyl)dibenzylzirconium, bis(pentamethylcyclopentadienyl)chloromethylzirconium, bis(pentamethylcyclopentadienyl)hydridemethylzirconium, (cyclopentadienyl)(pentamethylcyclopentadienyl)dichlorozirconium, ethylenebis(indenyl)dimethylzirconium, ethylenebis(tetrahydroindenyl)dimethylzirconium; ethylenebis(tetrahydroindenyl)dichlorozirconium, dimethylsilylenebis(cyclopentadienyl)dimethylzirconium, dimethylsilylenebis(cyclopentadienyl)dichlorozirconium, isopropyl(cyclopentadienyl)(9-fluorenyl)dimethylzirconium, isopropyl(cyclopentadienyl)(9-fluorenyl)dichlorozirconium, phenyl(methyl)methylene](9-fluorenyl)(cyclopentadienyl)dimethylzirconium, diphenyhnethylene(cyclopentadienyl)(9-fluorenyl)dimethylzirconium, ethylidene(9-fluorenyl)(cyclopentadienyl)dimethylzirconium, cyclohexyl(9-fluorenyl)(cyclopentadienyl)dimethylzirconium, cyclobenzyl(9-fluorenyl)(cyclopentadienyl)dimethylzirconium, cyclobutyl(9-fluorenyl)(cyclopentadienyl)dimethylzirconium, dimethylsilylene(9-fluorenyl)(cyclopentadienyl)dimethylzirconium, dimethylsilylenebis(2,3,5-trimethylcyclopentadienyl)dichlorozirconium, dimethylsilylenebis(2,3,5-trimethylcyclopentadienyl)dimethylzirconium.

Specific examples of vanadium compounds include vanadium trichloride, vanadyl trichloride, vanadium triacetylacetonato, vanadium tetrachloride, vanadium tributoxide, vanadyl dichloride, vanadyl bisacetylacetonato, vanadyl triacetylacetonato, dibenzenevanadium, dicyclopentadienylvanadium, dicyclopentadienylvanadium dichloride, cyclopentadienylvanadium dichloride and cyclopentadienylmethylvanadium.

Specific examples of niobium compounds include niobium pentachloride, tetrachloromethylniobium, dichlorotrimethylniobium, dicyclopentadienylniobium dichloride, dicyclopentadienylniobium trihydride, and pentabutoxyniobium.

Specific examples of tantalum compounds include tantalum pentachloride, dichlorotrimethyltantalum, dicyclopentadienyltantalum trihydride and pentabutoxytantalum.

Specific examples of chromium compounds include chromium trichloride, tetrabutoxychromium, tetramethylchromium, dicyclopentadienylchromium and dibenzenechromium.

As the other transition metal compounds, there may be employed the above-mentioned transition compounds each supported on a carrier such as a magnesium compound or a silicon compound and those each modified with an electron donative compound.

Among the above-mentioned transition metal compounds are particularly desirable the titanium compounds and the zirconium compounds.

As a component of the catalyst (1) in the present invention, an aluminoxane (b) is employed together with the transition metal compound (a). The aluminoxane is obtained by bringing an organoaluminum compound into contact with a condensation agent, and includes a chain aluminoxane represented by the general formula (V)

wherein $R^6$ is an alkyl group having 1 to 20 carbon atoms, is preferably a methyl group and p is a number from 0 to 50, preferably 5 to 30; and a cyclic aluminoxane represented by the general formula (VI)

wherein $R^6$ is as previously defined and q is a number from 2 to 50, preferably 5 to 30.

The organoaluminum compound is exemplified by a trialkylaluminum such as trimethylaluminum, triethylaluminum and triisobutylaluminum, of which is preferable trimethylaluminum.

The condensation agent is typified by water and exemplified by an arbitrary substance which undergoes condensation reaction with a trialkylaluminum such as copper sulphate pentahydrate, water adsorbed in an inorganic or organic substance and so forth.

In general, the contact product of an organoaluminum compound such as trialkylaluminum and water contains the above-mentioned chain alkylaluminoxane and cyclic alkylaluminoxane together with unreacted trialkylaluminum, various mixtures of condensates and further the molecules resulting from association in an intricate manner thereof. Accordingly, the resultant contact product varies widely depending upon the conditions of contact of trialkylaluminum with water as the condensation agent.

The reaction of the alkylaluminum compound and water is not specifically limited in the above case and may be effected according to the publicly known methods, which are exemplified by (1) a method in which an organoaluminum compound is dissolved in an organic solvent and then brought into contact with water, (2) a method in which an organoaluminum compound is first added to the reaction system at the time of polymerization and thereafter water is added thereto, and (3) a method in which an organoaluminum compound is reacted with the water of crystallization contained in metal salts and the like, or the water adsorbed in inorganic or organic materials. The above-mentioned water may contain up to about 20% of ammonia, amine such as ethylamine, sulfur compound such as hydrogen sulfide, phosphorus compound such as phosphite, or the like. The above-mentioned reaction proceeds even in the absence of a solvent but is preferably carried out in a solvent. Examples of the suitable solvent to be used here include aliphatic hydrocarbons such as hexane, heptane and decane, aromatic hydrocarbons such as benzene, toluene and xylene, and the like. The aluminoxane (e.g. an alkylalumioxane) is preferably obtained by a method wherein the solid residue produced after contact reaction in the case of a water-containing compound being used is removed by means of filtration and the filtrate is heat treated under atmospheric or reduced pressure at 30° to 200° C., preferably 40° to 150° C. for 20 minutes to 8 hours, preferably 30 minutes to 5 hours while distilling away the solvent used.

The temperature in the aforementioned heat treatment may be pertinently determined according to the various conditions, but should be usually within the above-described range. The temperature lower than 30° C. fails to bring about the prescribed effect, whereas that exceeding 200° C. causes thermal decomposition of aluminoxane itself, each resulting in unfavorable consequence.

The reaction product is obtained in the form of colorless solid or solution depending upon the heat treatment conditions, and can be used as the catalyst solution by dissolving in or diluting with a hydrocarbon solvent according to the demand.

Suitable examples of the aluminoxane, that is, the contact product of organoaluminum compound and a condensation agent which is used as the component of the catalyst, especially an alkylaluminoxane are those in which the area of the high magnetic field component in the methyl proton signal region due to the aluminum-methyl group (Al—CH$_3$) bond as observed by the proton nuclear magnetic resonance method is not more than 50% of the total signal area. That is, in a proton nuclear magnetic resonance ($^1$H-NMR) spectral analysis of the alkylaluminoxane in toluene solvent at room temperature, the methyl proton signal due to Al—CH$_3$ is observed in the region of 1.0 to −0.5 ppm (tetramethylsilane (TMS) standard). Since the proton signal of TMS (0 ppm) is in the region of the methyl proton signal due to Al—CH$_3$, the methyl proton signal due to Al—CH$_3$ is measured with 2.35 ppm methyl proton signal of toluene in TMS standard. The methyl proton signal due to Al—CH$_3$ is divided into two components: the high magnetic field component in the −0.1 to −0.5 ppm region and the other magnetic field component in the 1.0 to −0.1 ppm region. In alkylaluminoxane preferably used as component (B) of the catalyst in the present invention, the area of the high magnetic field component is not more than 50%, preferably 45 to 5% of the total signal area in the 1.0 to −0.5 ppm region.

As a component of the catalyst (2) in the present invention, there is employed (c) a compound capable of reacting with a transition metal compound to form an ionic complex together with the (a) transition metal compound. The (c) compound is not specifically limited but is exemplified by the compound represented by the general formula (VII) or (VIII)

wherein $L^2$ is $M^4$, $R^8R^9M^5$ or $R^{10}{}_3C$; $L^1$ is a Lewis base; $M^2$ and $M^3$ are each an element selected from Groups VB, VIB, VIIB, VIII, IB, IIB, IIIA, IVA and VA of the Periodic Table; $M^4$ and $M^5$ are each an element selected from Groups IIIB, IV, V, VIB, VIIB, VIII, I, IB, IIA, IIB and VIIA of the Periodic Table; $Z^1$ to $Z^e$ are each a hydrogen atom, a dialkylamino group, an alkoxy group having 1 to 20 carbon atoms, an aryloxy group having 6 to 20 carbon atoms, an alkyl group having 1 to 20 carbon atoms, an aryl group having 6 to 20 carbon atoms, an alkylaryl group, an arylalkyl group, a halogen-substituted hydrocarbon radical having 1 to 20 carbon atoms, an acyloxy group having 1 to 20 carbon atoms, an organometalloid group or a halogen atom and at least two of them may combine with each other to form a ring; $R^7$ is a hydrogen atom, an alkyl group having 1 to 20 carbon atoms, an aryll group having 6 to 20 carbon atoms, an alkylaryl group or an arylalkyl group; $R^8$ and $R^9$ are each a cyclopentadienyl group, a substituted cyclopentadienyl group, an indenyl group or a fluorenyl group; $R^{10}$ is an alkyl group having 1 to 20 carbon atoms, an aryl group, an alkylaryl group or an arylalkyl group; $R^{11}$ is a macrocyclic ligand such as tetraphenylporphyrin and phthalocyanine; f is the valency of each of $M^2$ and $M^3$, indicating an integer of 1 to 7; e is an integer of 2 to 8; u is the ion valency of each of $[L 1-R^7]$ and $[L^2]$, indicating an integer of 1 to 7; v is an integer of 1 or more; and $w=(v\times u)/(e-f)$.

Specific examples of the Lewis base represented by $L^1$ include amines such as ammonia, methylamine, aniline, dimethylamine, diethylamine, N-methylaniline, diphenylamine, trimethylamine, triethylamine, tri-n-butylamine, N,N-dimethylaniline, methyldiphenylamine, pyridine, 2,2-bipyridine, p-bromo-N,N′-dimethylaniline, p-nitro-N,N-dimethylaniline and phenanthroline; phosphines such as triethylphosphine, triphenylphosphine and diphenylphosphine; ethers such as dimethyl ether, diethyl ether, tetrahydrofuran dioxane; thioethers such as diethyl thioether and tetrahydrothiophene; esters such as ethylbenzoate; and nitriles such as acetonitrile and benzonitrile.

Specific examples of $M^2$ and $M^3$ include B, Al, Si, P, As, Sb, etc.; those of $M^4$ include Li, Na, Ag, Cu, Br, I, I$_3$, etc.; and those of $M^5$ include Mn, Fe, Co, Ni, Zn, etc. Specific examples of $Z^1$ to $Z^e$ include dialkylamino group such as dimethylamino and diethylamino, alkoxy group having 1 to 20 carbon atoms such as methoxy, ethoxy and n-butoxy; aryloxy group having 6 to 20 carbon atoms such as phenoxy, 2,6-dimethylphenoxy and naphthyloxy; alkyl group having 1 to 20 carbon atoms such as methyl, ethyl, n-propyl, iso-propyl, n-butyl, n-octyl and 2-ethylhexyl; aryl group having 6 to 20 carbon atoms, alkylaryl group or arylalkyl group such as phenyl, p-tolyl, benzyl, pentafluorophenyl, 3,5-di(trifluoromethyl)phenyl, 4-tert-butylphenyl, 2,6-dimethylphenyl, 3,5-dimethylphenyl, 2,4-dimethylphenyl, 2,3-dimethylphenyl and 1,2-dimethylphenyl; halogen-substituted hydrocarbon radical having 1 to 20 carbon atoms include p-fluorophenyl, 3,5-difluorophenyl, pentachlorophenyl, 3,4,5-trifluorophenyl, pentafluorophenyl and 3,5-di(trifluoromethyl)phenyl; halogen atoms such as F, Cl, Br and I and organometalloid group such as pentamethylantimony group, trimethylsilyl group, trimethylgermyl group, diphenylarsine group, dicyclohexylantimony group and diphenylboron group. Specific examples of $R^7$ and $R^{10}$ are as previously enumerated. Specific examples of substituted cyclopentadienyl group in $R^8$ and $R^9$ include alkyl group-substituted cyclopentadienyl group such as methylcyclopentadienyl, butylcyclopentadienyl and pentamethylcyclopentadienyl, where the alkyl group has usually 1 to 6 carbon atoms and the number of the substituted alkyl groups are selected from the integers of 1 to 4.

The compound represented by the general formula (VII) or (VIII) is preferably the compound in which $M^2$ or $M^3$ is boron, and enumerated, as preferably usable one of the general formula (VII), by triethylammonium tetraphenylborate, tri(n-butyl)ammonium tetraphenylborate, trimethylammonium tetraphenylborate, tetraethylammonium tetraphenylborate, methyltri(n-butyl)ammonium tetraphenylborate, benzyltri(n-butyl)ammonium tetraphenylborate, dimethyldiphenylammonium tetraphenylborate, methyltriphenylammonium tetraphenylborate, trimethylanilinium tetraphenylborate, methylpyridinium tetraphenylborate, benzylpyridinium tetraphenylborate, methyl(2-cyanopyridinium) tetraphenylborate, trimethylsulfonium tetraphenylborate, benzylmethylsulfonium tetraphenylborate, triethylammonium tetra(pentafluorophenyl)borate, triphenylammonium tetra(pentafluorophenyl)borate, tetrabutylammonium tetra(pentafluorophenyl)borate, tetraethylammonium tetra(pentafluorophenyl)borate, methyltri(n-butyl)ammonium tetra(pentafluorophenyl)borate, benzyltri(n-butyl)ammonium tetra(pentafluorophenyl)borate, methyldiphenylammonium tetra(pentafluorophenyl)borate, methyltriphenylammonium tetra(pentafluorophenyl)borate, dimethyldiphenylammonium tetra(pentafluorophenyl)borate, anilinium tetra(pentafluorophenyl)borate, methylanilinium tetra(pentafluorophenyl)borate, dimethylanilinium tetra(pentafluorophenyl)borate, trimethylanilinium tetra(pentafluorophenyl)borate, dimethyl(m-nitroanilinium) tetra(pentafluorophenyl)borate, dimethyl(p-bromoanilinium) tetra(pentafluorophenyl)borate, pyridinium tetra(pentafluorophenyl)borate, p-cyanopyridinium tetra(pentafluorophenyl)borate, N-methylpyridinium tetra(pentafluorophenyl)borate, N-benzylpyridinium tetra(pentafluorophenyl)borate, o-cyano-N-methylpyridinium tetra(pentafluorophenyl)borate, p-cyano-N-methylpyridinium tetra(pentafluorophenyl)borate, p-cyano-N-benzylpyridinium tetra(pentafluorophenyl)borate, trimethylsulfonium tetra(pentafluorophenyl)borate, benzyldimethylsulfonium tetra(pentafluorophenyl)borate, tetraphenylphosphonium tetra(pentafluorophenyl)borate, dimethylanilinium tetra(3,5-di-trifluoromethylphenyl)borate and triethylammonium hexafluoroarsenate.

Examples of the compound of the general formula (VIII) include ferrocenium tetraphenylborate, silver tetraphenylborate, trityl tetraphenylborate, (tetraphenylporphyrin manganate) tetraphenylborate, ferrocenium tetra(pentafluorophenyl)borate, decamethylferrocenium tetra(pentafluorophenyl)borate, acetylferrocenium tetra(pentafluorophenyl)borate, formylferrocenium tetra(pentafluorophenyl)borate, cyanoferrocenium tetra(pentafluorophenyl)borate, silver tetra(pentafluorophenyl)borate, trityl tetra(pentafluorophenyl)borate, lithium tetra(pentafluorophenyl)borate, sodium tetra(pentafluorophenyl)borate, (tetraphenylporphyrin manganate) tetra(pentafluorophenyl)borate, (tetraphenylporphyrinium chloride) tetra(pentafluorophenyl)borate, (tetraphenylporphyrin zincate) tetra(pentafluorophenyl)borate, silver tetrafluoroborate, silver hexafluoroarsenate and silver hexafluoroantimonate.

As the compound other than that represented by the general formula (VII) or (VIII), there are usable, for example, tri(pentafluorophenyl)borate, tri[3,5-di(trifluoromethyl)phenyl]borate and triphenylborate.

In the present invention, an organometallic compound as component (d) may be employed, as desired, in combination with the above-described catalyst (1) or (2), and is represented by the general formula (IX)

where $R^{12}$ is an alkyl group having 1 to 20 carbon atoms, an alkenyl group having 2 to 20 carbon atoms, a cycloalkyl group having 3 to 20 carbon atoms, an aryl group having 6 to 20 carbon atoms or aralkyl group having 7 to 20 carbon atoms, and is specifically exemplified by methyl group, ethyl group, n-propyl group, isopropyl group, n-butyl group, isobutyl group, hexyl group, 2-ethylhexyl group and phenyl group; $M^6$ is lithium, sodium, potassium, magnesium, zinc, cadmium, aluminum, boron, gallium, silicon or tin; and r is the valency of $M^6$.

Various compounds of the general formula (IX) are available and specifically exemplified by an alkyllithium compound such as methyllithium, ethyllithium, propyllithium and butyllithium; an alkylmagnesium compound such as diethylmagnesium, ethylbutylmagnesium and di-n-butylmagnesium; a dialkylzinc compound such as dimethylzinc, diethylzinc, dipropylzinc and dibutylzinc; an alkylgallium compound such as trimethylgallium, triethylgallium and tripropylgallium; an alkylboron compound such as triethylboron, tripropylboron and tributylboron; and an alkyltin compound such as tetraethyltin, tetrapropyltin and tetraphenyltin.

There are available a variety of compounds of the general formula (IX) wherein $M^6$ is aluminum, which are specifically exemplified by trimethylaluminum, triethylaluminum, triisopropylaluminum, triisobutylaluminum, tri-n-hexylaluminum and trioctylaluminum.

The proportion of each component of the catalyst to be used in the present invention varies depending on the type and content each of the styrenic monomer constituting the graft chain and the polymerizable unsaturated bond and can not be unequivocally determined, however in the catalyst (1), the molar ratio of the transition metal (e.g. titanium) in the component (a) to the aluminum in the component (b) is desirably 1 to $10^6$, more desirably 10 to $10^4$.

On the other hand, in the catalyst (2), the molar ratio of the component (a) to the component (c) is desirably 0.01 to 100, more desirably 1 to 10. In this case, the components (a) and (c) may be previously brought into contact with each other, followed by separation and washing of the resultant contact product for use, or may be brought into contact in the reaction system. The amount of the component (d) to be used as desired in the catalyst (1) or (2) is selected usually in the range of 0 to 100 tools per one (1) tool of the component (a). The use of the component (d) can improve the polymerization activity, but an excessive usage does not manifest the effect corresponding thereto. The component (d) may be used by bringing it into contact with the component (a) or (c) or the contact product between the components (a) and (c) in advance or by the successive addition to the polymerization system.

The proportion of the styrenic monomer to the graft precursor (high polymer having polymerizable carbon-carbon double bonds in the side chain thereof) to be used in the present invention is desirably selected in the range of 1 to $10^6$, preferably 2 to $10^5$ in terms of molar ratio at the graft point.

The proportion of the styrenic monomer to the catalyst to be used is not particularly limited, but is selected usually in the range of 10 to $10^{12}$, preferably $10^2$ to $10^8$ in terms of the molar ratio of the styrenic polymer to the transition metal compound.

In the polymerization reaction according to the present invention, the polymerization temperature is selected usually in the range of 0 to 120° C., preferably 10 to 80° C., and the polymerization time is desirably selected in the range of 1 second to 10 hours. As the polymerization method, any of bulk, solution and suspension polymerization is available. The usable solvents in solution polymerization are exemplified by aliphatic hydrocarbons such as pentane, hexane and heptane, alicyclic hydrocarbons such as cyclohexane, aromatic hydrocarbons such as benzene, toluene and xylene, among which are preferable aliphatic hydrocarbons and aromatic hydrocarbons. In this case, the monomer/solvent ratio by volume may be arbitrarily selected.

The use of the vinylstyrenic compound represented by the general formula (I) as the graft point-forming monomer enables successive graft copolymerization by successive addition of the catalyst components by virtue of the high conversion efficiency in the production of the precursor as well as the low amount of the unreacted monomer at the completion of reaction.

On the other hand, in the case where the vinylstyrenic compound represented by the general formula (II) is used, it is preferable to remove the unreacted monomer by washing etc., to prevent side reactions such as crosslinkage for the purpose of successive graft copolymerization by successive addition of the catalyst components because of low conversion efficiency in the production of the precursor along with the high amount of the unreacted monomer at the completion of reaction. Further, in order to prevent crosslinkage the content of vinylstyrene in the precursor is preferably limited to the range of $10^{-4}$ to 2 mol %.

The use of a low-boiling diene compound such as 1,3-butadiene or isoprene as the graft point-forming monomer enables successive graft copolymerization because of the facility in removing the unreacted monomer after the production of the precursor.

It is necessary that the graft copolymer of the present invention obtained in the above-mentioned manner has a reduced viscosity of 0.01 to 30, desirably 0.05 to 25, more desirably 0.1 to 10 dl/g as measured at a concentration of 0.05 g/dl in 1,2,4-trichlorobenzene at 135° C. or a melt index of 0.001 to 500, desirably 0.005 to 300 g/10 minutes as measured at 300° C. with a load of 2.16 kg. A reduced viscosity thereof less than 0.01 dl/g or a melt index thereof more than 500 g/10 min. results in insufficient mechanical-strength, whereas the reduced viscosity exceeding 30 dl/g or a melt index less than 0.001 g/10 min. causes deterioration of moldability and workability.

The stereostructure of the chain consisting of the styrenic monomer unit in the graft copolymer of the present invention is of high degree of syndiotactic configuration having such syndiotacticity that the proportion of racemic diad is 75% or more, preferably 85% or more or the proportion of racemic pentad is 30% or more, preferably 50% or more.

The content of the chain consisting of the styrenic monomer unit is 0.005 to 99.9%, desirably 0.1 to 99%, more desirably 0.1 to 90%, particularly desirably 0.1 to 50%, most desirably 0.5 to 50% each by weight. The content in the range of usually 0.1 to 50% by weight is effective in enhancing the elasticity, strength and heat resistance of the graft precursor and enables the copolymer to be utilized as a thermoplastic elastomer and a resin compatibilizer. The content in the range of usually 50 to 99.9% by weight is effective in softening and toughening the SPS as the graft component and also enables the copolymer to be utilized as a resin compatibilizer. The content less than 0.1% by weight unfavorably results in failure to allow the chain consisting of the styrenic monomer unit to sufficiently function as the stabilizing layer and to attain sufficient mechanical-strength of the copolymer, while that exceeding 99.9% by weight leads to the copolymer that is destitute of the properties as an elastomer due to decrease in the soft phase in the copolymer.

Particularly, favorable graft copolymer as the elastomer among them is that excellent in mechanical properties, having high strength and high elongation, and exhibiting a tensile strength of 200 to 500 kg/cm$^2$, a tensile elongation of 100 to 600% and a tensile modulus of elasticity of 1,000 to 20,000 kg/cm$^2$.

The resin composition according to the present invention is a thermoplastic resin composition which contains the above-described graft copolymer, maintains the characteristics thereof and is endowed with compatibility, adhesivity, impact resistance and well balanced physical properties.

Specifically, the above-mentioned resin composition comprises (A) the above-described graft copolymer, (B) at least one member selected from a styrenic polymer having a high degree of syndiotactic configuration and a thermoplastic resin other than said polymer and/or (C) at least one filler selected from an inorganic filler and an organic filler.

Here, the styrenic polymer in the component (B) which has syndiotactic configuration means that its stereochemical structure is of syndiotactic configuration, that is, the stereostructure in which phenyl groups or substituted phenyl groups as side chains are located alternately at opposite directions relative to the main chain consisting of carbon-carbon bonds. Tacticity is quantitatively determined by the nuclear magnetic resonance method ($^{13}$C-NMR method) using carbon isotope. The tacticity as determined by the $^{13}$C-NMR method can be indicated in terms of proportions of structural units continuously connected to each other, i.e., a diad in which two structural units are connected to each other, a triad in which three structural units are connected to each other and a pentad in which five structural units are connected to each other. The styrenic copolymers having such syndiotactic configuration as mentioned in the present invention usually means a polymer having such syndiotacticity that the proportion of racemic diad is at least 75%, preferably at least 85%, or the proportion of racemic pentad is at least 30%, preferably at least 50% in the main chain structure of styrenic repeating units. However, the degree of syndiotactic configuration varies to some extent depending on the types of substituents and the like.

The molecular weight of the styrenic polymer thus obtained varies depending on the polymerization conditions, and usually ranges from 5,000 to 4,500,000, preferably more than 10,000 expressed in terms of weight-average molecular weight.

The styrenic polymer having such high degree of syndiotactic configuration is obtained by polymerizing the styrenic monomer represented by the general formula (III) by means of bulk, solution or suspension polymerization by the use of the catalyst same as that to be used for graft-copolymerizing the styrenic monomer in the production of the graft copolymer as the component (A). The polymerization process may be either continuous or discontinuous.

The usable solvents when used in the polymerization are exemplified by aliphatic hydrocarbons such as pentane, hexane and heptane, alicyclic hydrocarbons such as cyclohexane and aromatic hydrocarbons such as benzene, toluene and xylene, of which at least two may be used in combination. The monomer/solvent ratio may be arbitrarily selected. The polymerization conditions are not specifically limited, but polymerization temperature shall be $-100°$ to 250° C., preferably 0° to 80° C., polymerization time shall be 5 min. to 24 hours, preferably 1 hour or longer and polymerization pressure is not specifically limited.

For the purpose of modifying the molecular weight of the polymer to be obtained, it is effective to carry out polymerization reaction in the presence of hydrogen.

Specific examples of the styrenic monomer represented by the general formula (III) are the same as those exemplified hereinbefore. Any of the styrenic monomers may be used alone or in combination with at least one other styrenic monomer for the purpose of copolymerization. In addition, the third component such as an olefinic monomer or a polar monomer may be incorporated therein insofar as the third component does not considerably impair the properties of the styrenic polymer or the syndiotactic configuration in the chain consisting of the repeating units. Various types of thermoplastic resins other than SPS are available and exemplified by polyolefin resin, condensation high polymer, addition polymerization high polymer, etc. Specific examples of polyolefin resins include high density polyethylene, low density polyethylene, poly-3-methyl-butene-1, poly-4-methyl-pentene-1, straight-chain low density polyethylene obtained by the use of such a comonomer as butene-1, hexene-1, octene-1,4-methylpenten-1,3-methylisobutene or the like, ethylene/vinyl acetate copolymer, saponified product thereof, ethylene/acrylic acid copolymer, ethylene/acrylic ester copolymer, ethylenic ionomer, polypropylene, etc. Specific examples of polystyrene resin include general-purpose polystyrene, isotactic polystyrene, high impact polystyrene (rubber modified), etc. Specific examples of the condensation high polymer include polyacetal resin, polycarbonate resin, polyamide resin such as nylon 6 and nylon 6.6, polyester resin such as polyethylene terephthalate and polybutylene terephthalate, polyphenylene oxide resin, polyimide resin, polysulfone resin, polyethersulfone resin, polyphenylene sulfide resin, etc.

Specific examples of addition polymer include a polymer obtained from a polar vinyl monomer, a polymer obtained from a diene monomer, etc. enumerated by poly(methyl methacrylate), polyarylonitrile, acrylonitrile/butadine copolymer, acrylonitrile/butadiene/styrene copolymer, a polymer having hydrogenated diene chains, thermoplastic elastomer, etc. Each of the above-described thermoplastic resins may be used alone or in combination with at least one of others.

The types of the inorganic filler and the organic filler to be used as the component (C) of the composition of the present invention are not specifically restricted, but may be the known types having various forms such as granule, plate, lamella, fiber and whisker.

As the inorganic filler., there are usable inorganic-matter type filler, metallic filler, ceramics filler, etc. Examples of the inorganic-matter type filler include an oxide such as silica, diatomaceous earth, barium ferrite, berylium oxide, pumice ,and pumice balloon; a hydroxide such as aluminum hydroxide, magnesium hydroxide and basic magnesium carbonate; a carbonate such as calcium carbonate, magnesium carbonate, dolomite and dosonite; a sulfate or sulfite such as calcium sulfate, barium sulfate, ammonium sulfate and calcium sulfite; a silicate such as talc, clay, mica, asbestos, glass fiber, glass balloon, glass bead, calcium silicate, montmorillonite and bentonite; a carbon such as carbon black, graphite, carbon fiber and hollow carbon sphere; molybdenum sulfide; boron fiber; zinc borate; barium rectaborate; calcium borate; and sodium borate.

Examples of the metallic filler include a metal element, metal compound, alloy, etc. each in the form of powder or granule, specifically exemplified by a metal element such as zinc, copper, iron, lead, aluminum, nickel, chromium, titanium, manganese, tin, platinum, tungsten, gold, magnesium, cobalt and strontium; the oxide thereof; an alloy such as stainless steel, solder and brass; metallic fiber such as aluminum fiber, stainless-steel fiber, copper fiber, bronze fiber, nickel fiber, potassium titanate fiber, other simple metal fiber and synthetic fiber and corresponding metal whiskers.

Examples of the ceramics filler include silicon carbide, silicon nitride, zirconia, aluminum nitride, titanium carbide each in the form of powder, granule, fiber or whisker.

Examples of the organic filler include shell fiber such as husk, wooden powder, cotton, jute, paper piece, cellophane piece, aromatic polyamide fiber, polyimide fiber, cellulose fiber, nylon fiber, polyester fiber, ultra-high molecular polyethylene fiber, polypropylene fiber and thermosetting resin powder. The above-mentioned filler may be used alone or in combination with at least one of other fillers.

The composition according to the present invention may be subjected as desired to the addition of at least one additive enumerated by heat resistant stabilizer, weatherproof stabilizer, antistatic agent, sliding agent, anti-blocking agent, anti-fogging agent, lubricant, foaming agent, dye, pigment, natural oil, synthetic oil, wax, etc. in a pertinent compounding ratio. Specific examples of the stabilizers to be optionally compounded include phenolic antioxidant such as tetrakis[methylene-3(3,5-di-tert-butyl-4-hydroxyphenyl)propionate]methane, β-(3,5-di-ten-butyl-4-hydroxyphenyl)propionic alkylester and 2,2'-oxamindebis-[ethyl-3(3,5-di-tert-butyl-4-hydroxyphenyl)]propionate; metallic salt of fatty acid such as zinc stearate, calcium stearate and calcium 12-hydroxystearate; polyhydric alcohol-fatty acid ester such as glycerol monostearate, glycerol monolaurate, glycerol distearate, pentaerythritol monostearate, pentaerythritol distearate and pentaerythritol tristearate. Each of the aforementioned additives may be compounded alone or in combination with other additive/s, which combination being exemplified as the preferable one by tetrakis[methylene-3(3,5-di-tert-butyl-4-hydroxyphenyl)propionate]methane, zinc stearate and glycerol monostearate.

The compounding ratio by weight of the graft copolymer as the component (A) to the thermoplastic resin as the component (B) in the resin composition of the present invention is selected in the range of usually 0.5:99.5 to 99.5:0.5, preferably 1:95 to 99:5.

The compounding ratio by weight of the graft copolymer as the component (A) to the inorganic filler or the organic filler, when compounded in the composition as the component (C) is desirably 20:80 to 95:5, more desirably 40:60 to 90:10.

The compounding ratio by weight of resin mixture of the graft copolymer as the component (A) with the thermoplastic resin as the component (C) to the inorganic filler or the organic filler, when compounded in the composition, [(A)+(B)]:C is desirably 20:80 to 95:5, more desirably 40:60 to 90:10.

The resin composition of the present invention can be prepared by any of various procedures without specific limitation, preferably by the melt kneading that is conventionally used in a thermoplastic resin composition by the use of a known means such as Banbury mixer, single-screw or twin-screw extruder, kneader, continuous mixer or mixing roll, or by means of solution blending using a suitable solvent.

The graft copolymer according to the present invention not only maintains the inherent characteristic of SPS excellent in heat resistance, chemical resistance, electrical properties and moldability, but also is favorable in toughness, tensile strength, tensile elongation and tensile modulus of elasticity and is improved in compatibility with an olefinic or diolefinic resin, thus making itself effectively utilizable for a raw material for composite materials, heat resistant elastomer and the like.

In addition, the resin composition comprising the aforementioned graft copolymer as the principal component according to the present invention also maintains the inherent characteristics of SPS excellent in heat resistance, chemical resistance, electrical properties and moldability and is endowed with compatibility, adhesivity, impact resistance and well-balanced physical properties at a high level, thereby rendering itself favorably utilizable as a raw material in the application field requiring heat resistance as well as impact resistance such as automobile, electric and electronics fields.

In the following, the present invention will be described in more detail with reference to Examples, which however, shall not be construed to limit the invention thereto.

EXAMPLE 1

(1) Preparation of methylalumioxane

In a 500 ml glass vessel which had been purged with argon were placed 200 ml of toluene, 17.7 g (71 mmol) of copper sulfate pentahydrate ($CuSO_4$-$5H_2O$) and 24 ml (250 mmol) of trimethylaluminum, which were then reacted at 40° C. for 8 hours. Then, the solids were separated from the reaction mixture and the toluene was distilled away from the solution as obtained above under reduced pressure to obtain 6.7 g of a contact product (methylalumioxane). The molecular weight thereof as determined by the freezing point depression method was 610. Further, when the area of the high magnetic field component by $^1$H-NMR spectral analysis based on Japanese Patent Application Laid-Open No. 325391/1987, that is, the proton nuclear magnetic resonance spectral of the methylaluminoxane in toluene solvent at room temperature was observed, the methyl proton signal due to Al-$CH_3$ was observed in the region of 1.0 to $-0.5$ ppm (tetramethylsilane (TMS) standard). Since the proton signal of TMS (0 ppm) was in the region of methyl proton signal due to Al-$CH_3$, the methyl proton signal due to Al-$CH_3$ was measured with 2.35 ppm methyl proton signal of toluene in TMS, and the methyl proton signal due to Al-$CH_3$ was divided into two components. As the result, the high magnetic field component (i.e. $-0.1$ to $-0.5$ ppm) was 43% of the total signal area.

(2) Preparation of solid catalyst component

In a 500 ml four-necked flask which had been sufficiently dried were introduced 150 ml of dehydrated and purified n-heptane, 10.0 g (88 mmol) of magnesium diethoxide and then 1.06 g (17.5 mmol) of isopropyl alcohol with stirring to heat the mixture up to 80° C. and treat for one (1) hour. Subsequently, the mixture was cooled to room temperature, the supernatant liquid was removed and the content in the flask was incorporated with 150 ml of n-heptane and subjected to alternate stirring and liquid removal twice to wash itself. Thereafter, in the flask were introduced 150 ml of n-heptane, 2.63 g (17.5 mmol) of ethyl benzoate and 83 g (440 mmol) of titanium tetrachloride, and the mixture was heated to the boiling point to proceed with reaction for 2 hours. The mixture was cooled to 80° C., allowed to stand to remove the supernatant liquid, incorporated with 150 ml of n-heptane and subjected to stirring, standing and liquid removal twice to wash itself. To the mixture was again added 83 g of titanium tetrachloride to proceed with reaction at the boiling point for one (1) hour. The resultant reaction product was allowed to stand to remove the supernatant liquid, incorporated with n-heptane and subjected to repeated cycle of stirring, standing and liquid removal to wash itself until chlorine ion was no longer detected, thus affording a solid catalyst component. Then, measurement was made for Ti component in the resultant solid catalyst component by means of colorimetric method. The result was 48 mg-Ti/g-carrier in terms of unit quantity supported on the carrier.

(3) Preparation of copolymer (graft precursor)

In a one (1) liter pressure autoclave which had been dried were placed 600 ml of deaerated purified toluene, 3 mmol of triisobutylaluminum and 10 mmol of p-(3-butenyl)styrene to raise the temperature up to 70° C. to initiate stirring. The mixture was saturated with propylene at a pressure of 7 kg/cm$^2$, and after the stoppage of its feeding, was further saturated with ethylene at 3 kg/cm²G. Then, to the saturated mixture was added the solid catalyst as prepared in the preceding item (2) in an amount of 0.015 mmol as Ti atom to proceed with copolymerization for one (1) hour, while the reaction pressure was adjusted so as to maintain the total pressure of ethylene at 10 kg/cm²·G. After the completion of reaction, the unreacted gas was removed and the resultant polymer was cleaned with methanol to afford 222 g of white powder.

(4) Preparation of graft copolymer

In a one (1) liter separable flask equipped with a stirrer was dissolved 44.4 g of the graft precursor obtained in the item (3) in about 600 ml of toluene, which was distilled away under reduced pressure at 70° C. The precursor was dissolved in 400 ml of another dry toluene, and incorporated with 200 ml of styrene, 10 mmol of triisobutylaluminum and 10 mmol of methylaluminoxane to maintain the mixture at 70° C. for 5 min. Thereafter, to the mixture was added 50 μmol of pentamethylcyclopentadienyltitanium trimethoxide [Cp*Ti(OMe)₃] to initiate graft polymerization. In the reaction system, polymerization progressed by the addition of the catalyst, changing the system from solution to heterogeneous state. After 10 min. of reaction, methanol was poured into the system to arrest the polymerization, followed by methanol washing to afford 113 g of graft copolymer.

(5) Analysis of the graft copolymer

In the following, the polymer obtained in the item (4) will be proved to be a graft copolymer.

(a) Infrared (IR) absorption spectrum analysis

Figure 1:
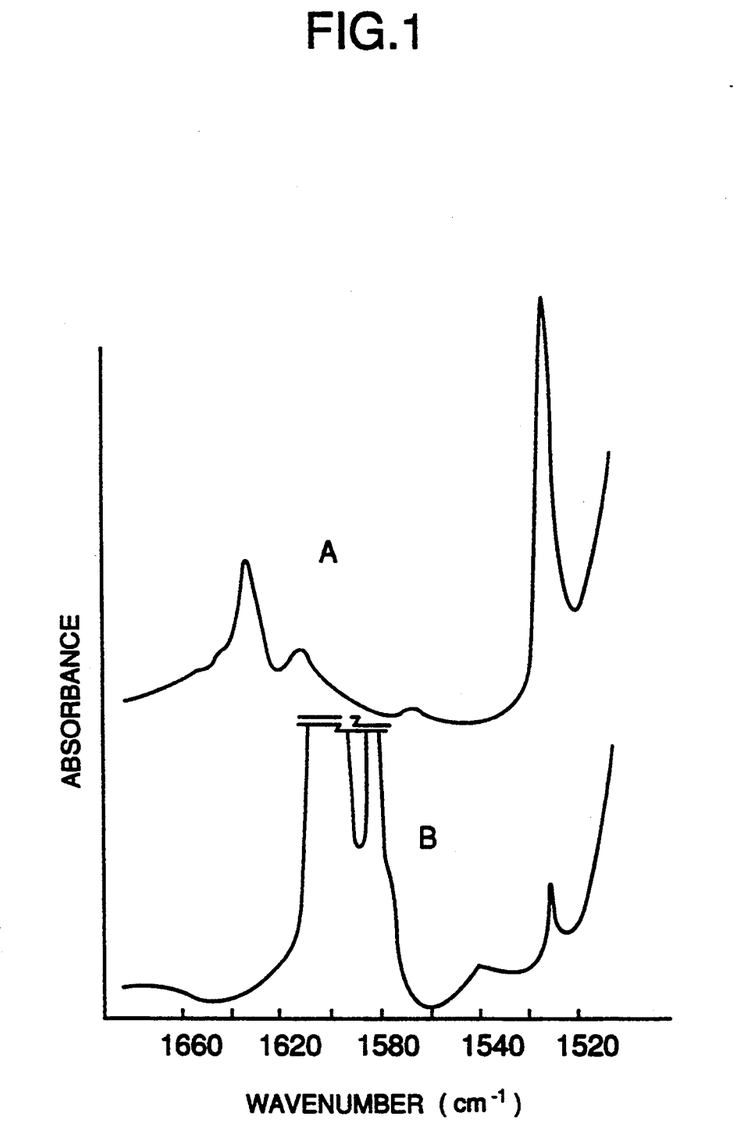
FIG. 1 is an enlarged sectional view showing the IR spectra of the graft precursor marked with "A" and the graft copolymer marked with "B" each obtained in Example 1.

In FIG. 1 are shown the IR absorption spectra of the graft precursor of item (3) (marked with "A") and graft copolymer of item (4) (marked with "B"). There is observed at 1630 cm⁻¹ in the graft precursor spectrum, the stretching vibration of carbon-carbon double bond based on p-(3-butenyl)styrene unit, but in the graft copolymer spectrum, the vibration disappears. It is proved thereby that graft copolymerization progressed via the styrene residue of the p-(3-butenyl)styrene.

(b) Analysis of graft chain

There was detected a sharp signal of quaternary carbon of the aromatic ring at 145.2 ppm assigned to styrene. As a result of DSC analysis, the melting point of the graft copolymer was found to be 268° C.

It has been demonstrated from the above-mentioned results that the graft copolymer as prepared in item (4) is that having SPS as the graft chain.

The graft copolymer had a reduced viscosity of 1.9 dl/g, a content of p-(3-butenyl)styrene unit in the copolymer (precursor) of 0.15% by weight by IR absorption spectrum analysis (IR analysis), a molar ratio of ethylene unit/propylene unit of 35:65 by ¹H-NMR analysis, a content of styrene unit in the graft copolymer of 60.7% by weight and melt index at 300° C. and 2.16 kg load (MI) of 3.2 g/10 min.

EXAMPLE 2

The procedure in Example 1 (4) was repeated except that copolymerization was carried out for 12 min., using 39.6 g of the graft precursor in Example 1 (3), 50 ml of styrene, 2 mmol of triisobutylaluminum, 2 mmol of methylaluminoxane and 10 μmol of [Cp*Ti(OMe)₃]. As a result, a graft copolymer was obtained at a yield of 40.3 g, which had a content of styrene unit in the graft copolymer of 2.0% by weight, a reduced viscosity of 1.9 dl/g and MI of 0.74 g/10 min.

EXAMPLES 3 TO 6

In the same manner as in Example 1 (3) and (4), ethylene/propylene/p-(3-butenyl)styrene series graft copolymers were prepared using 600 ml of toluene and 3 mmol of isobutylaluminum. The preparation conditions and the results obtained are given in Tables 1 (1), (2), (3), (4) and (5).

TABLE 1(1)

| | Preparation Condition of Copolymer | | | |
|---|---|---|---|---|
| | 3BSt[*1] (mmol) | Ethylene Pressure (kg/cm² G) | Propylene Pressure (kg/cm² G) | Titanium Catalyst[*2] (mmol) |
| Example 3 | 1.0 | 1.5 | 3.0 | 0.01 |
| Example 4 | 3.0 | 1.5 | 3.0 | 0.01 |
| Example 5 | 20 | 5.0 | 4.0 | 0.003 |
| Example 6 | 20 | 5.0 | 4.0 | 0.003 |

[*1]: p-(3-butenyl)styrene
[*2]: titanium catalyst component as prepared in Example 1(2).

TABLE 1(2)

| | Preparation Condition of Copolymer | | | |
|---|---|---|---|---|
| | Temperature (°C.) | Time (min) | Yield (g) | Ethylene/propylene Composition Ratio (mol/mol) |
| Example 3 | 6 | 30 | 120 | 18/82 |
| Example 4 | 6 | 30 | 59 | 73/27 |
| Example 5 | 30 | 360 | 160 | 63/37 |
| Example 6 | 50 | 360 | 207 | 79/21 |

TABLE 1(3)

| | Preparation Condition of Graft Copolymer | | | |
|---|---|---|---|---|
| | Ethylene/ Propylene/ 3BSt Copolymer (g) | Styrene (mol) | TIBA[*3] (mmol) | MAO[*4] (mmol) |
| Example 3 | 10 | 200 | 10 | 10 |
| Example 4 | 20 | 50 | 10 | 10 |
| Example 5 | 40 | 200 | 10 | 10 |
| Example 6 | 30 | 100 | 10 | 10 |

[*3]: triisobutylaluminum
[*4]: Methylaluminoxane as prepared in Example 1(1).

TABLE 1(4)

| | Preparation Condition of Graft Copolymer | | | |
|---|---|---|---|---|
| | Titanium (mmol) | Temperature (°C.) | Time (min) | Yield (g) |
| Example 3 | 0.012[*5] | 70 | 180 | 41.2 |
| Example 4 | 0.012[*5] | 70 | 180 | 27.0 |
| Example 5 | 0.1[*6] | 70 | 120 | 49.7 |
| Example 6 | 0.1[*6] | 70 | 60 | 32.1 |

[*5]: Cp*Ti (OMe)₃
[*6]: CpTiCl₃

TABLE 1(5)

| | Physical Properties of Graft Copolymer | | | | |
|---|---|---|---|---|---|
| | 3BSt Content (wt %) | SPS Content (wt %) | Melting Point (°C.) | MI | Reduced Viscosity (dl/g) |
| Example 3 | ~0.01 | 75.5 | 268 | 2.0 | 1.8 |
| Example 4 | 0.30 | 25.9 | 268 | 2.9 | 5.0 |
| Example 5 | 0.75 | 19.5 | 248 | 0.6 | 2.6 |
| Example 6 | 0.71 | 6.5 | 247 | 0.7 | 2.9 |

The procedure in Example 1 (3) was repeated except that 8 mmol of p-(3-butenyl)styrene was used, 2.0 mmol of triethylaluminum was used in place of triisobutylaluminum, propylene was continuously fed at 7 kg/cm²G without the use of ethylene and hydrogen was introduced at 0.2 kg/cm² prior to the propylene feeding. After the copolymerization, methanol was used for deactivation and cleaning to afford 150 g of a polymer.

(2) Preparation of graft copolymer

The procedure in Example 1 (2) was repeated except that reaction was effected for one (1) hour, using 29 g of the graft precursor in the above item (1). The reaction progressed in slurry state. As a result, a graft copolymer was obtained at a yield of 36.5 g, which had a ,content of styrene unit in the graft copolymer of 20.5% by weight. As a result of DSC analysis, there were observed at first a melting point of 148° C. based on the isotactic polypropylene and then a melting point of 268° C. based on the SPS. The graft copolymer had a boiling heptane-insoluble portion of 92% by weight and MI of 0.005 g/10 min.

EXAMPLE 8

The procedure in Example 1 (3) was repeated except that copolymerization was carried out at 80° C. by the use of 400 ml of toluene, 5 mmol of p-(3-butenyl)styrene and 0.02 mmol of titanium component of the catalyst, while hydrogen was introduced at 7 kg/cm²G, followed by continuous feeding of ethylene at 3 kg/cm²G without the use of propylene.

The copolymer was obtained at a yield of 42 g, 20 g of which was employed for performing graft copolymerization reaction for one (1) hour in the same manner as in Example 1. The reaction progressed in slurry state. As a result, a graft copolymer was obtained at a yield of 25.2 g, which had a content of styrene unit in the graft copolymer of 20.6% by weight. As a result of DSC analysis, there were observed at first a melting point of 134° C. based on polyethylene and then a melting point of 268° C. based on SPS. The graft copolymer had a reduced viscosity of 0.92 dl/g and MI of 3.2 g/10 min.

EXAMPLES 9 AND 10

Graft copolymerization was carried out in the similar manner to Example 1 using the graft precursor in amounts as shown in Table 2 and the styrenic monomer the species and amount of which are also shown in Table 2 under the following reaction conditions. The results are given in Table 2.

TABLE 2

| | Amount of graft precursor charged (g) | Styrenic monomer Species | Styrenic monomer Amount | Yield (g) | η sp/c (dl/g) | Point (°C.) | MI |
|---|---|---|---|---|---|---|---|
| Example 9 | 10 | p-methyl-styrene | 50 ml | 13.6 | 2.3 | — | 3.5 |
| Example 10 | 12 | p-phenyl-styrene | 16 g | 14.7 | 3.0 | 350 | — |

Reaction conditions
toluene: 400 ml
triisobutylaluminum: 3 mmol
methylaluminoxane: 3 mmol
Cp*Ti(OMe)₃: 10 μm
temperature: 70° C.
reaction time: 1 hour

EXAMPLE 11

(1) Preparation of tri(n-butyl)ammonium tetra(pentafluorophenyl)borate

Pentafluorophenyllithium which was prepared from 152 mmol of bromopentafluorobenzene and 152 mmol of butyllithium was reacted with 45 mmol of trichloroboron in hexane to produce tri(pentafluorophenyl)boron as white solid, 41 mmol of which was reacted with 41 mmol of pentafluorophenyllithium to produce lithium tetra(pentafluorophenyl)boron as white solid and isolate the same.

Then, 16 mmol of lithium tetra(pentafluorophenyl)-boron was reacted with 16 mmol of tri-n-butylamine hydrochloride in water to produce 12.8 mmol of tri(n-butyl)ammonium tetrapentafluorophenyl)borate as white solid.

(2) Preparation of graft copolymer

Graft copolymerization was carded out for 30 min. in the similar manner to Example 1, using 20 g of the graft precursor as prepared in Example 1 (3), 1 mmol of triisobutylaluminum, 50 μmol of the boron compound as prepared in the above item (1) in place of aluminoxane and 10 μmol of pentamethylcyclopentadienyltrimethyltitanium (Cp*TiMe₃) in place of Cp*Ti(OMe)₃. After the reaction, methanol was used for deactivation and cleaning to afford 54.3 g of a graft copolymer, which had a content of styrene unit in the graft copolymer of 63.1% by weight and a reduced viscosity of 3.0 dl/g.

EXAMPLE 12

In a one (1) liter pressure autoclave were placed 500 ml of n-heptane, 20 ml of divinylbenzene (m-, p-mixture, content of 55% by weight produced by Tokyo Kasei Co., Ltd.), 2 mmol of diethylaluminum chloride and 100 mg of titanium trichloride (produced by Toyo Stofer Co., Ltd. under the brandname TOB-04) in that order. To the mixture was added hydrogen at 0.2 kg/cm²G to initiate copolymerization between propylene and divinylbenzene, which was continued at a propylene pressure of 7 kg/cm²G at 65° C. for 3 hours.

After the completion of the polymerization reaction, the residual monomer was discharged and the polymer slurry was filtered to afford 112 g of a copolymer in the form of powder, 39 g of which was used to effect graft copolymerization for one (1) hour under the reaction conditions as shown in Example 2. The reaction progressed in slurry state. As a result, a graft copolymer was obtained at a yield of 41.8 g, which had a content of styrenic unit in graft copolymer of 6.7% by weight. As a result of DSC analysis, there were observed at first a melting point of 163° C. based on isotactic polypropylene and then a melting point of 268° C. based on the SPS. The graft copolymer had a reduced viscosity of 2.0 dl/g, a boiling heptane-insoluble portion of 97% by weight and MI of 2.3 g/10 min.

EXAMPLE 13

In a one (1) liter pressure autoclave which had been dried in advance were placed 600 ml of deaerated purified toluene, 3 mmol of triisobutylaluminum and 15 mmol of p-(3-butenyl)styrene to raise the temperature up to 70° C. to initiate stirring. The mixture was saturated with propylene at a pressure of 7 kg/cm², and after the stoppage of its feeding, was further saturated with ethylene at 3 kg/cm²G. Then, to the saturated mixture was added the solid catalyst as prepared in the preceding item (2) in an amount of 0.015 mmol as Ti atom to proceed with copolymerization for one (1) hour, while the reaction pressure was adjusted so as to maintain the total pressure of ethylene at 10 kg/cm²·G. After the completion of reaction, the unreacted gas was removed by depressurization. In order to completely remove the unreacted gas, dry nitrogen at 70° C. was blown into the autoclave for 30 min, while toluene as the solvent was evaporated outside the reaction system. Subsequently to the mixture were added 10 mmol of nethylaluminoxane as prepared in Example 1 (1), and immediately thereafter 200 ml of styrene to proceed with graft reaction at 70° C. for 3 hours. After the completion of reaction, methanol was used for deactivation and cleaning to afford 151 g of a graft polymer.

The graft copolymer thus obtained had a melting point of 266° C. as determined by DSC analysis, a reduced viscosity of 3.0 dl/g, an ethylene unit/propylene unit/styrene unit molar ratio of 33.2/61.6/5.2, and MI of 1.6 g/10 min. There was not detected the absorption at 1630 cm$^{-1}$ based on p-(3-butenyl)styrene in the IR absorption spectrum of the graft copolymer.

EXAMPLE 14

(1) Preparation of copolymer (graft precursor)

In a one (1) liter pressure autoclave which had been dried were placed 600 ml of deaerated purified toluene, 3 mmol of isobutylaluminum and 10 mmol of p-(3-butenyl)styrene to raise the temperature up to 50° C. to initiate stirring. The mixture was saturated with propylene at a pressure of 3 kg/cm², and after the stoppage of its feeding, was further saturated with ethylene at 7 kg/cm²G. Then, to the saturated mixture was added the solid catalyst as prepared in Example 1 (2) in an amount of 0.015 mmol as Ti atom to proceed with copolymerization for one (1) hour, while the reaction pressure was adjusted so as to maintain the total pressure of ethylene at 10 kg/cm²G. After the completion of reaction, the unreacted gas was removed and the resultant polymer was cleaned with methanol to afford 156 of white powder.

(2) Preparation of graft copolymer

In a one (1) liter separable flask equipped with a stirrer was dissolved 44.4 g of the graft precursor obtained in the item (1) in about 600 ml of toluene, which was distilled away under reduced pressure at 50° C. The precursor was dissolved in 400 ml of another dry toluene, and incorporated with 200 ml of styrene, 10 mmol of triisobutylaluminum and 10 mmol of methylaluminoxane to maintain the mixture at 50 for 5 min. Thereafter, to the mixture was added 50 μmol of pentamethylcyclopentadienyltitanium trimethoxide [Cp*Ti(OMe)₃] to initiate graft polymerization. In the reaction system, polymerization progressed by The addition of the catalyst, changing the system from solution to heterogeneous state. After 10 min. of reaction, methanol was poured into the system to arrest the polymerization, followed by methanol washing to afford 82 g of graft copolymer.

(3) Analysis of the graft copolymer

The graft copolymer obtained in the above item (2) was subjected to (a) infrared (IR) absorption spectrum analysis and (b) analysis of graft chain in the same manner as in Example 1. As a result, it has been demonstrated that the graft copolymer as prepared in item (2) is that having SPS as the graft chain.

The graft copolymer had a reduced viscosity of 1.9 dl/g, a content of p-(3-butenyl)styrene unit in the copolymer (precursor) of 0.15% by weight by IR absorption spectrum analysis (IR analysis), a molar ratio of ethylene unit/propylene unit of 65:35 by ¹H-NMR analysis, a content of styrene unit in the graft copolymer of 45.8% by weight and melt index at 300° C. and 2.16 kg load (MI) of 3.2 g/10 min.

In order to determine the mechanical properties, the resultant copolymer was hot-pressed into a film, which was measured for tensile strength characteristics. As a result, the film had a tensile strength of 320 kg/cm², a tensile elongation of 380% and a tensile modulus of elasticity of 12,000 kg/cm².

EXAMPLE 15

The procedure in Example 14 (2) was repeated except that copolymerization was carried out for 12 min., using 39.6 g of the graft precursor in Example 14 (1), 50 ml of styrene, 2 mmol of triisobutylaluminum, 2 mmol of methylaluminoxane and 10 μmol of [Cp*Ti(OMe)₃]. As a result, a graft copolymer was obtained in a yield of 41.6 g, which had a content of styrene unit in the graft copolymer of 4.8% by weight, a reduced viscosity of 1.9 dl/g and MI of 0.74 g/10 min. It had a tensile strength of 260 kg/cm², a tensile elongation of 580% and a tensile modulus of elasticity of 3,800 kg/cm².

EXAMPLE 16

The procedure in Example 14(2) was repeated except that copolymerization was carried out for 30 min., using 32.8 g of the graft precursor in Example 14(1), 200 ml of styrene, 1 mmol of triisobutylaluminum, 10 mmol of methylaluminoxane and 50 μmol of cyclopentadienyltitanium trichloride [CpTiCl₃]. As a result, a graft copolymer was obtained in a yield of 39.4 g, which had a content of styrene trait in the graft copolymer of 16.8% by weight, a reduced viscosity of 1.6 dl/g and MI of 2.8 g/10 min. It had a tensile strength of 300 kg/cm², a tensile elongation of 420% and a tensile modulus of elasticity of 7,000 kg/cm².

EXAMPLES 17 TO 20 AND COMPARATIVE EXAMPLES 1

In the same manner as in Examples 14(1) and (2), ethylene/propylene/p-(3-butenyl)styrene series graft copolymers were prepared using 600 ml of toluene and 3 mmol of isobutylaluminum. The preparation conditions are given in Tables 3(1), (2), (3), and (4), and the results of physical properties measurements are given in Tables 4(1) and (2).

TABLE 3(1)

| | Preparation Condition of Copolymer | | | |
|---|---|---|---|---|
| | 3BSt*¹ (mmol) | Ethylene Pressure (kg/cm² G) | Propylene Pressure (kg/cm² G) | Titanium Catalyst*² (mmol) |
| Example 17 | 1.0 | 6.0 | 3.0 | 0.003 |
| Example 18 | 3.0 | 6.0 | 3.0 | 0.003 |
| Example 19 | 20 | 6.0 | 3.0 | 0.003 |
| Example 20 | 20 | 6.0 | 3.0 | 0.003 |
| Comparative | 0 | — | — | — |

TABLE 3(1)-continued

| | Preparation Condition of Copolymer | | | |
|---|---|---|---|---|
| | 3BSt*[1] (mmol) | Ethylene Pressure (kg/cm² G) | Propylene Pressure (kg/cm² G) | Titanium Catalyst*[2] (mmol) |
| Example 1 | | | | |

*[1]: p-(3-butenyl)styrene
*[2]: titanium catalyst component as prepared in Example 1(2).

TABLE 3(2)

| | Preparation Condition of Copolymer | | | |
|---|---|---|---|---|
| | Temperature (°C.) | Time (min) | Yield (g) | Ethylene/propylene Composition Ratio (mol/mol) |
| Example 17 | 50 | 60 | 88 | 58/42 |
| Example 18 | 50 | 60 | 100 | 65/35 |
| Example 19 | 50 | 60 | 106 | 72/28 |
| Example 20 | 50 | 60 | 128 | 79/21 |
| Comparative Example 1 | — | — | — | 70/30 |

TABLE 3(3)

| | Preparation Condition of Graft Copolymer | | | |
|---|---|---|---|---|
| | Ethylene/ Propylene/ 3BSt Copolymer (g) | Styrene (mol) | TIBA*[3] (mmol) | MAO*[4] (mmol) |
| Example 17 | 30 | 100 | 10 | 10 |
| Example 18 | 30 | 100 | 10 | 10 |
| Example 19 | 30 | 100 | 10 | 10 |
| Example 20 | 30 | 100 | 10 | 10 |
| Comparative Example 1 | — | — | — | — |

*[3]: triisobutylaluminum
*[4]: Methylaluminoxane as prepared in Example 1(1).

TABLE 3(4)

| | Preparation Condition of Graft Copolymer | | | |
|---|---|---|---|---|
| | Titanium (mmol) | Temperature (°C.) | Time (min) | Yield (g) |
| Example 17 | 0.012*[5] | 70 | 60 | 58 |
| Example 18 | 0.012*[5] | 70 | 60 | 55 |
| Example 19 | 0.1*[6] | 70 | 60 | 38 |
| Example 20 | 0.1*[6] | 70 | 60 | 36 |
| Comparative Example 1 | — | — | — | — |

*[5]: Cp*Ti (OMe)₃
*[6]: CpTiCl₃

TABLE 4(1)

| | Physical Properties of Graft Copolymer | | | |
|---|---|---|---|---|
| | Weight of SPS (wt %) | Melting Point (°C.) | MI (g/10 min) | Reduced Viscosity (dl/g) |
| Example 17 | 48.3 | 268 | 4.2 | 2.2 |
| Example 18 | 45.4 | 268 | 3.8 | 2.4 |
| Example 19 | 21.0 | 247 | 2.6 | 1.8 |
| Example 20 | 16.7 | 242 | 2.0 | 1.7 |

SPS: Syndiotactic polystyrene

TABLE 4(2)

| | Mechanical Properties of Graft Copolymer | | |
|---|---|---|---|
| | Tensile strength (kg/cm²) | Tensile elongation (%) | Tensile modulus of elasticity (kg/cm²) |
| Example 17 | 400 | 320 | 15,000 |
| Example 18 | 360 | 360 | 11,000 |
| Example 19 | 280 | 480 | 6,800 |
| Example 20 | 270 | 510 | 6,600 |
| Comparative Example 1 | 30 | 600 | less than 500 |

PREPARATION EXAMPLE 1 (Preparation of Graft Copolymer)

(1) Preparation of copolymer (graft precursor)

In a one (1) liter pressure autoclave which had been dried were placed 600 ml of deaerated purified toluene, 3 mmol of isobutylaluminum and 10 mmol of p-(3-butenyl)styrene to raise the temperature up to 70° C. to initiate stirring. The mixture was saturated with propylene at a pressure of 7 kg/cm²G, and after the stoppage of its feeding, was further saturated with ethylene at 3 kg/cm²G. Then, to the saturated mixture was added the solid catalyst as prepared in Example 1(2) in an amount of 0.015 mmol as Ti atom to proceed with copolymerization for one (1) hour, while the reaction pressure was adjusted so as to maintain the total pressure of ethylene at 10 kg/cm²G. After the completion of reaction, the unreacted gas was removed and the resultant polymer was cleaned with methanol to afford 222 g of white powder.

(2) Preparation of graft copolymer

In a one (1) liter separable flask equipped with a stirrer was dissolved 39.6 g of the graft precursor obtained in the above item (1) in about 600 ml of toluene, which was distilled away under reduced pressure at 70° C. The precursor was dissolved in 400 ml of another dry toluene, and incorporated with 200 ml of styrene, 2 mmol of triisobutylaluminum and 2 mmol of methylaluminoxane to maintain the mixture at 70° C. for 5 min. Thereafter, to the mixture was added 10 μmol of pentamethylcyclopentadienyltitaniun trimethoxide [Cp*Ti(OMe)₃] to initiate graft polymerization. After 10 min. of reaction, methanol was poured into the system to arrest the polymerization, followed by methanol washing to afford 40.3 g of a graft copolymer, which had a content of styrene unit of 2.0% by weight and a reduced viscosity of 1.41 dl/g.

PREPARATION EXAMPLE 2 (Preparation of Graft Copolymer)

The procedure in Preparation Example 1(1) was repeated to obtain 22.7 g of a copolymer except that polymerization was carried out at a polymerization temperature of 17° C. at a propylene pressure of 3.0 kg/cm²G and an ethylene pressure of 1.5 kg/cm²G, using the solid catalyst in an amount of 0.005 mmol and 10 mmol of p-(3-butenyl)styrene.

Further, the procedure in Preparation Example 1(2) was repeated to obtain 40.1 g of a graft copolymer except that copolymerization was carried out at 70° C. for 3 hours, using 20 g of the copolymer thus obtained 50 ml of styrene, 10 mmol of triisobutylaluminum, 10 mmol of methylaluminoxane and 20 μmol of [Cp*Ti(OMe)₃]. The graft copolymer thus obtained had a content of styrene unit of 49.8% by weight and a reduced viscosity of 1.23 dl/g.

EXAMPLES 21 TO 23 AND COMPARATIVE EXAMPLES 2

By the use of a 100 ml Laboplastomill (produced by Toyo Seiki Co., Ltd.), the resins compounded in compounding ratios as shown in Table 5 were melt kneaded at 280° C. and 50 r.p.m. for 8 min. to prepare the resin compositions. The enlarged sectional views (about 300×magnitude) showing the compatible state of the compositions are given in FIGS. 2 to 5.

Then, the melt kneaded resin composition and SPS were each hot pressed at 300° C. and cooled with a cold press into a plate with 2 mm thickness. Subsequently, each plate was machined into Izod impact test piece to determine Izod impact strength (with notch). The results are given in Table 6.

TABLE 5

Figure 2:
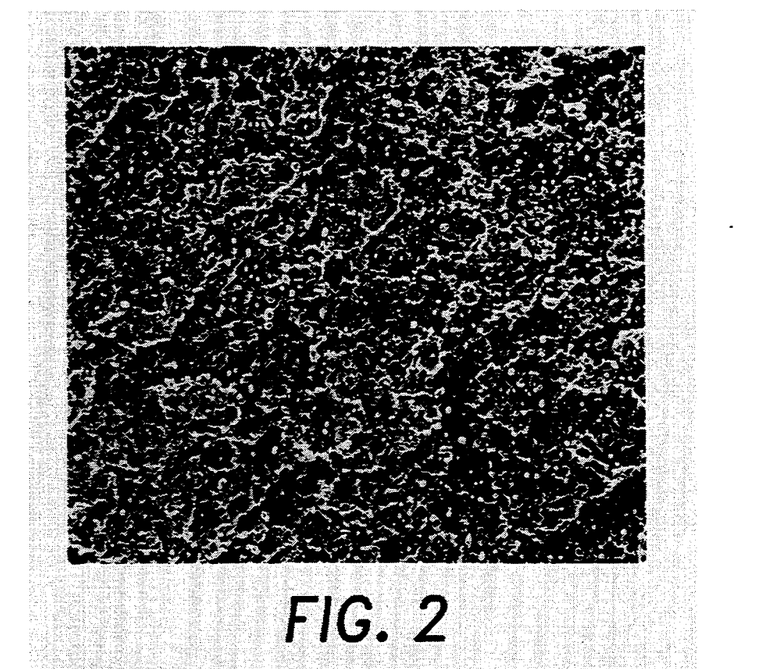
FIG. 2 is an enlarged sectional view showing the compatible state of the resin composition obtained in Example 21.
Figure 3:
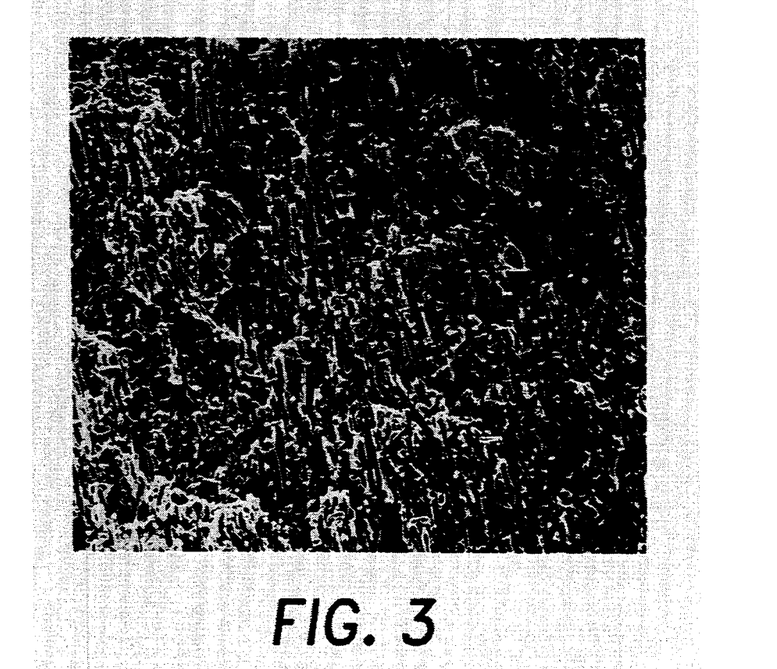
FIG. 3 is an enlarged sectional view showing the compatible state of the resin composition obtained in Example 22.
Figure 4:
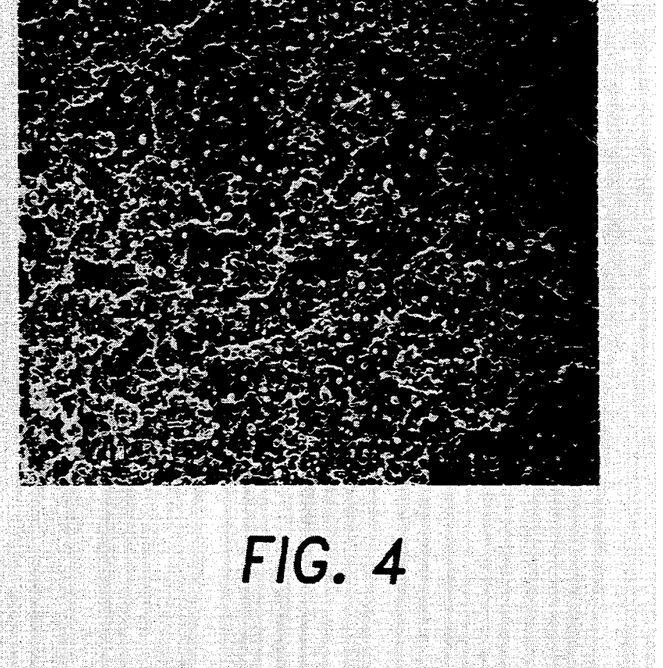
FIG. 4 is an enlarged sectional view showing the compatible state of the resin composition obtained in Example 23.
Figure 5:
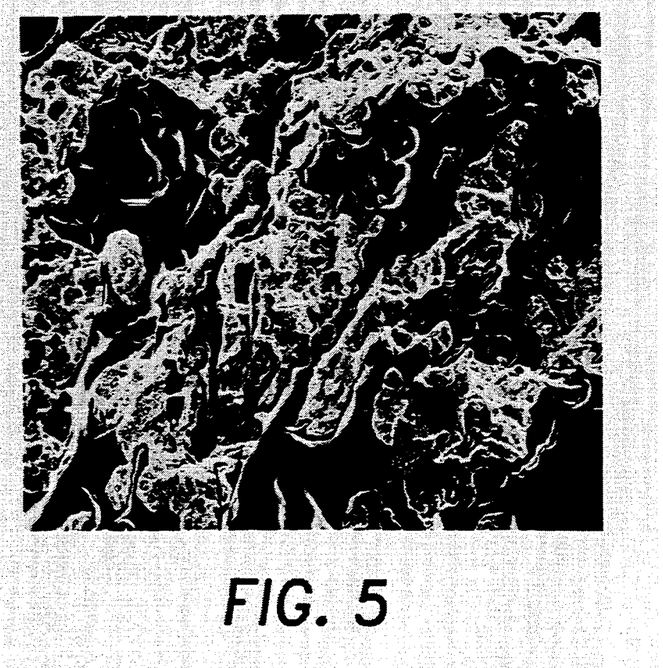
FIG. 5 is an enlarged sectional view showing the compatible state of the resin composition obtained in Comparative Example 2.

| | Composition (wt. parts) | | Graft copolymer | | Enlarged Sectional view showing compatible state |
|---|---|---|---|---|---|
| | SPS [1] | EP [2] | Preparation Example 1 | Preparation Example 2 | |
| Example 21 | 55.7 | — | 14.3 | — | FIG. 2 |
| Example 22 | 46.5 | 18.5 | — | 5.0 | FIG. 3 |
| Example 23 | 53.5 | 11.5 | — | 5.0 | FIG. 4 |
| Comparative Example 2 | 55.7 | 14.3 | — | — | FIG. 5 |

[1] SPS: Syndiotactic polystyrene (Mw = 560,000)
[2] EP: ethylene/propylene copolymer (produced by Mitsui Petrochemical Industries Co., Ltd., trade name "P0680")

TABLE 6

| | Izod impact strength (with notch) (kg · cm/cm) |
|---|---|
| Example 21 | 5.8 |
| Example 22 | 4.8 |
| Example 23 | 3.6 |
| Comparative Example 2 | 1.2 |
| SPS[1] | 0.8 |

[1] SPS: Syndiotactic polystyrene (Mw = 560,000)

EXAMPLES 24 AND 25

100 parts by weight of each of the resin compositions as prepared in Examples 21 and 22 was compounded with 30 parts by weight of glass fiber (3 m length) and talc, respectively to prepare a resin composition in a similar manner to Example 21. The resin composition thus obtained was compression molded into a test piece, the fractured surface of which was observed with an electron microscope. As a result, the interface between the resin and the filler exhibited favorable bonding.

What is claimed is:

1. A resin composition which comprises:
   (A) a graft copolymer formed by grafting a styrene monomer onto a high polymer having polymerizable carbon-carbon double bonds in the side chains thereof to copolymerize therewith forming grafted syndiotactic polystyrene chains, wherein said high polymer is comprised of olefinic monomer units derived from monomers selected from the group consisting of ethylene, α-olefins, halogen-substituted α-olefins, cyclic olefins and mixtures thereof and diolefinic monomer units and the carbon-carbon double bonds in the side-chain of said high polymer are derived from said diolefinic monomer unit, wherein said polystyrene side chains of said graft copolymer have a high degree of syndiotactic configuration, the content of said styrene monomer units is 0.005–99.9% by weight; the reduced viscosity of said graft copolymer is 0.01–30 dl/g as measured at a concentration of 0.05 g/dl in 1,2,4-trichlorobenzene at 135° C. or said graft copolymer has a melt index of 0.001–500 g/10 min as measured at 300° C. under a load of 2.16 kg; together with (B), (C) or mixtures thereof, wherein
   (B) is a member selected from the group consisting of styrene polymers having a high degree of syndiotactic configuration and thermoplastic resins other than said styrene polymer; and
   (C) is at least one filler selected from the group consisting of inorganic fillers and organic fillers.

2. The resin composition of claim 1, comprising (A) and (B).

3. The resin composition of claim 2, wherein said graft copolymer (A) has a content of grafted polystyrene chains of 0.005–99% by weight.

4. The resin composition of claim 1, comprising (A) and (C).

5. The resin composition of claim 4, wherein said graft copolymer (A) has a grafted polystyrene content of 0.005–99% by weight.

6. The resin composition of claim 1, wherein said graft copolymer (A) has a content of grafted polystyrene chains of 0.005–99% by weight.

7. The resin composition of claim 1, wherein said α-olefin is selected from the group consisting of propylene, 1-butene, 1-hexene, 1-octene, 1-decene, 1-heptene, 1-pentene, 1-nonene, 4-phenyl-1-butene, 6-phenyl-1-hexene, 3-methyl-1-butene, 4-methyl-1-pentene, 3-methyl-1-pentene, 3-methyl-1-hexene, 4-methyl-1-hexene, 5-methyl-1-hexene, 3,3-dimethyl-1-pentene, 3,4-dimethyl-1-pentene, 4,4-dimethyl-1-pentene, vinylcyclohexane, vinylcyclohexene and mixtures thereof.

8. The resin composition of claim 1, wherein said halogen-substituted α-olefin is selected from the group consisting of hexafluoropropene, tetrafluoroethylene, 2-fluoropropene, fluoroethylene, 1,1-difluoroethylene, 3-fluoropropene, trifluoroethylene and 3,4-dichloro-1-butene.

9. The resin composition of claim 1, wherein said cyclic olefin is selected from the group consisting of norbornene, 5-methylnorbornene, 5-ethylnorbornene, 5,6-dimethylnorbornene and 1-methylnorbornene.

10. The resin composition of claim 1, wherein said diolefin monomer units are derived from conjugated dienes having 4–20 carbon atoms.

11. The resin composition of claim 10, wherein said conjugated dienes are selected from the group consisting of 1,3-butadiene, chloroprene, isoprene, 1,3-hexadiene and 1,3-heptadiene.

12. The resin composition of claim 1, wherein said diolefin monomer units are derived from vinylnorbornene or a vinylstyrene compound having formula (I) or (II)

(I)

or (II)

wherein R¹ is a hydrocarbon radical having 1-20 carbon atoms; R² is a halogen atom or a hydrocarbon radical having 1-8 carbon atoms; R³ is a hydrogen atom, a halogen atom or a hydrocarbon radical having 1-8 carbon atoms; and m is zero or an integer from 1-4, and when m is two or more, a plurality of R² may be the same or different.

13. The resin composition of claim 12, wherein said vinylstyrene compound is selected from the group consisting of p-(2-propenyl)styrene, m-(2-propenyl)styrene, p-(3-butenyl)styrene, m-(3-butenyl)styrene, o-(3-butenyl)styrene, p-(4-pentenyl)styrene, m-(4-pentenyl)styrene, o-(4-pentenyl)styrene, p-(7-octenyl)styrene, p-(2-methyl-3-butenyl)styrene, p-(1-methyl-3-butenyl)styrene, p-(3-methyl-3-butenyl)styrene, p-(2-ethyl-3-butenyl)styrene, p-(2-ethyl-4-pentenyl)styrene, m-(2-methyl-3-butenyl)styrene, o-(2-methyl-3-butenyl)styrene, 4-vinyl-4'-(3-butenyl)biphenyl, 4-vinyl-4'-(4-pentenyl)biphenyl, 4-vinyl-3'-(3-butenyl)biphenyl, 4-vinyl-2'-(4-pentenyl)biphenyl, 4-vinyl-4'-(2-methyl-3-butenyl)biphenyl, m-(3-butenyl)-α-methylstyrene, o-(3-butenyl)-α-methylstyrene and p-(3-butenyl)-α-methylstyrene.

14. The resin composition of claim 1, wherein said high polymer is an ethylene/α-olefin copolymer having polymerizable carbon-carbon double bonds in the side chains thereof.

15. The resin composition of claim 14, wherein said ethylene/α-olefin copolymer comprises 40-98 mol % of ethylene units and 60-2 mol % of α-ethylene units.

16. A process for producing a graft copolymer formed by grafting a styrene monomer onto a high polymer having polymerizable carbon-carbon double bonds in the side chains thereof to copolymerize therewith forming grafted syndiotactic polystyrene chains, wherein said high polymer is comprised of olefinic monomer units derived from monomers selected from the group consisting of ethylene, α-olefins, halogen-substituted α-olefins, cyclic olefins and mixtures thereof and diolefinic monomer units and the carbon-carbon double bonds in the side-chain of said high polymer are derived from said diolefinic monomer unit comprising:

grafting said styrene monomer onto said high polymer in the presence of a catalyst comprising as principal components (1)(a) a transition metal compound and (b) an aluminoxane; or (2)(a) a transition metal compound and (c) a compound capable of reacting with a transition metal compound to form an ionic complex.

17. The process of claim 16, wherein said polymerizable carbon-carbon double bonds in the side chain of said high polymer are derived from a vinylstyrene compound having formula (I) or (II)

(I)

or (II)

wherein R¹ is a hydrocarbon radical having 1-20 carbon atoms; R² is a halogen atom or a hydrocarbon radical having 1-8 carbon atoms; R³ is a hydrogen atom, a halogen atom or a hydrocarbon radical having 1-8 carbon atoms; and m is zero or an integer from 1-4, and when m is two or more, a plurality of R² may be the same or different.

18. The process of claim 16, wherein said high polymer is an ethylene/α-olefin copolymer having polymerizable carbon-carbon double bonds in the side chain thereof.

* * * * *